US005610999A

United States Patent [19]

Bannai et al.

[11] Patent Number: 5,610,999
[45] Date of Patent: Mar. 11, 1997

[54] IMAGE PROCESSING APPARATUS AND METHOD THAT ADDS CORRECTION SIGNAL TO AVERAGE DENSITY AND DIGITIZES ACCORDINGLY

[75] Inventors: Yuichi Bannai, Koganei; Kunihiro Yamamoto, Machida; Hidefumi Osawa, Kawaguchi, all of Japan

[73] Assignee: Canon Kabushiki Kaisha, Tokyo, Japan

[21] Appl. No.: 266,665

[22] Filed: Jun. 28, 1994

Related U.S. Application Data

[63] Continuation of Ser. No. 13,662, Feb. 4, 1993, abandoned, which is a continuation of Ser. No. 731,471, Jul. 17, 1991, abandoned.

[30] Foreign Application Priority Data

| Jul. 20, 1990 | [JP] | Japan | 2-190828 |
| Oct. 19, 1990 | [JP] | Japan | 2-279172 |
| Dec. 19, 1990 | [JP] | Japan | 2-403851 |
| Dec. 19, 1990 | [JP] | Japan | 2-403852 |

[51] Int. Cl.⁶ ............................................. G06K 9/36
[52] U.S. Cl. ...................... 382/272; 358/457; 358/466
[58] Field of Search ................... 382/22, 50, 52, 382/237, 267, 270, 272; 358/455, 456, 457, 458, 465, 466; H04N 1/40

[56] References Cited

U.S. PATENT DOCUMENTS

| 4,339,774 | 7/1982 | Temple | 358/283 |
| 4,562,486 | 12/1985 | Suzuki et al. | 358/282 |
| 4,760,460 | 7/1988 | Shimotohno | 358/261 |
| 4,853,792 | 8/1989 | Katsuta et al. | 358/455 |
| 4,878,125 | 10/1989 | Katayama et al. | 358/443 |
| 4,924,322 | 5/1990 | Kurosawa et al. | 358/448 |
| 4,955,065 | 9/1990 | Ulichney | 382/50 |
| 4,958,238 | 9/1990 | Katayama et al. | 358/456 |
| 5,016,118 | 5/1991 | Nannichi | 358/462 |
| 5,053,887 | 10/1991 | Thompson | 358/457 |
| 5,086,484 | 2/1992 | Katayama et al. | 382/50 |
| 5,121,447 | 6/1992 | Tanioka et al. | 382/50 |
| 5,153,925 | 10/1992 | Tanioka et al. | 382/52 |
| 5,208,873 | 5/1993 | Nakajima | 382/50 |
| 5,278,672 | 1/1994 | Shimazaki | 358/456 |

FOREIGN PATENT DOCUMENTS

| 0333520 | 3/1989 | European Pat. Off. | |
| 62-121590 | 6/1987 | Japan | 382/50 |

OTHER PUBLICATIONS

Patent Abstracts Of Japan, vol. 14, No. 22, Jan. 17, 1990, abstract for Japanese 01-264071, Oct. 1989.

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

There is disclosed a method for converting multi-level image data into binary image data and an apparatus therefor. An average density is calculated from the already binarized density of pixels positioned in a predetermined area around an object pixel, and the threshold value for binarization is set by adding a fixed bias value and varying dither signals to the average density, and the error generated in the binarization is distributed to the unbinarized pixels positioned behind. The addition of the fixed bias prevents formation of a spot-free white area in the vicinity of an edge or in the initial stage of processing, and the addition of dither signals prevents texture formation in the low density area.

20 Claims, 15 Drawing Sheets

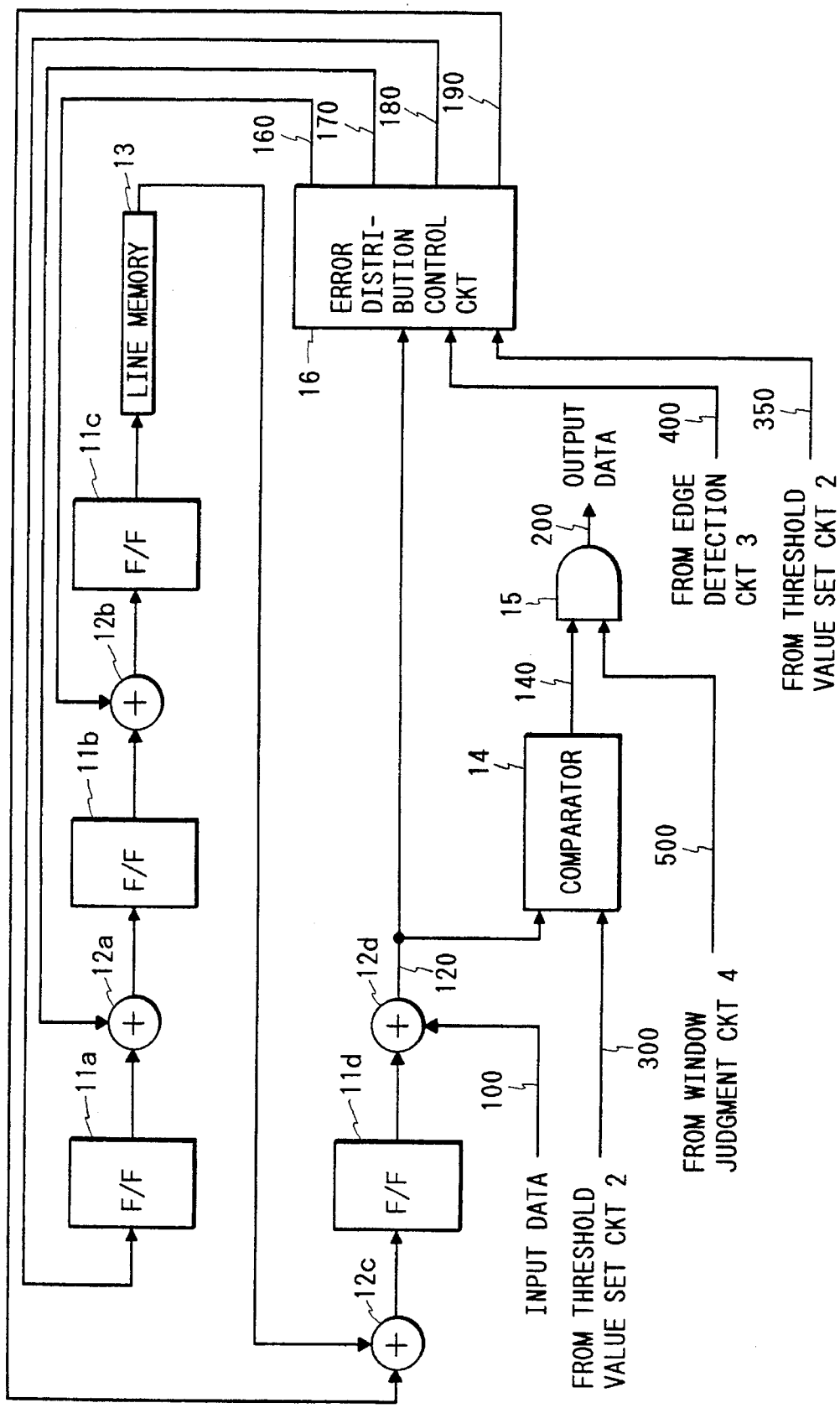

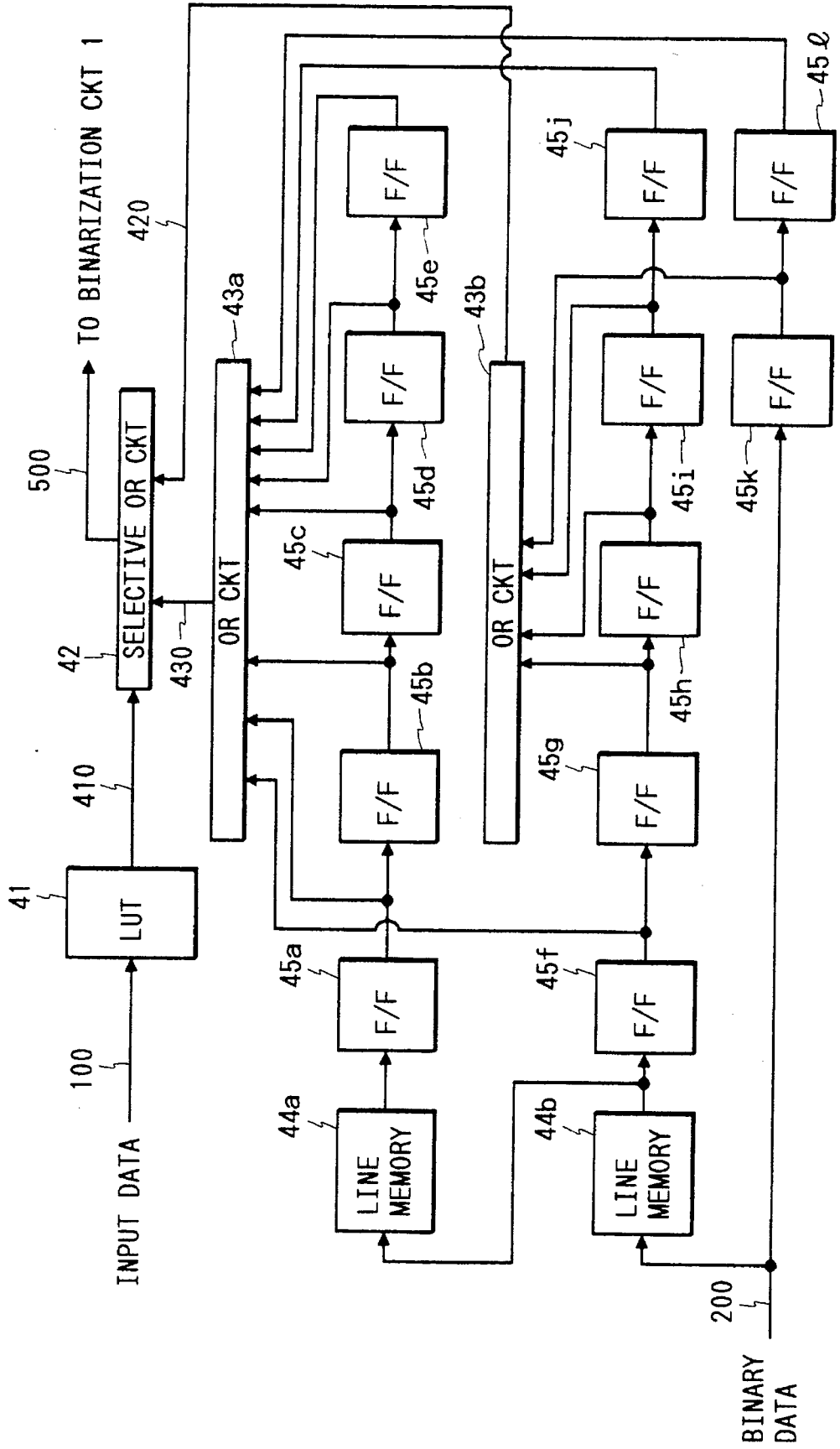

IMAGE PROCESSING APPARATUS AND METHOD THAT ADDS CORRECTION SIGNAL TO AVERAGE DENSITY AND DIGITIZES ACCORDINGLY

This application is a continuation of application Ser. No. 08/013,662, filed Feb. 4, 1993, now abandoned, which was a continuation of application Ser. No. 07/731,471 filed Jul. 17, 1991, now abandoned.

BACKGROUND OF THE INVENTION

1. Field of the Invention

The present invention relates to an image processing method for binary digitizing multi-level data, and an image processing apparatus utilizing said image processing method.

2. Related Background Art

For binary digitization of multi-level image data, there is already known a dither method, in which an m×n dither matrix (m, n being natural numbers) is prepared, and the multi-value data are compared with corresponding threshold values in the matrix to form a binarized m×n matrix, thereby reproducing a halftone image in a pseudo manner. However such dither method can only reproduce m×n+1 density levels, and is also limited in resolving power. On the other hand, the error diffusion method, proposed in 1975 in an article "An adaptive Algorithm for Spatial Grayscale" in SID DIGEST, is superior in the resolving power and the tonal rendition, and is attracting attention in recent years.

In said error diffusion method, the binary digitizing is conducted with a fixed threshold value, and the difference between a corrected density, obtained by adding the error diffused from the past pixels to the density of an object pixel and the binarized density (0 or 255 in case of 8 bits) is diffused as a new error to forward pixels.

However the binary digitizing with said error diffusion method results, in the presence of a low density area in the initial part of digitizing, in the formation of a white area without any dot in such low density area.

A similar phenomenon is encountered in the low density area in the vicinity of edges of an image.

Also in a uniform low density area, the dots are not distributed uniformly, and the reproduced image gives an unpleasant granular feeling.

Furthermore, in a uniform density area, there are generated textures in the image, and sometimes pseudo contours.

In order to prevent such drawbacks in the error diffusion method, certain proposals have been made in U.S. patent application Ser. No. 270,809 filed Nov. 14, 1988, U.S. patent application Ser. No. 319,057 filed Mar. 6, 1989 and U.S. patent application Ser. No. 396,339 filed Aug. 21, 1989.

These inventions obtain an image of high quality, but require a large amount of two-dimensional calculations in the correction of error between the input image data and the output image data, whereby the hardware structure becomes very complicated.

Also there have also been proposed binary digitizing methods capable of providing an image equivalent to that obtainable in the error diffusion method with a reduced amount of processing, in U.S. patent application Ser. No. 476,766 filed Feb. 18, 1990, Ser. No. 514,616 filed Apr. 26, 1990 and Ser. No. 515,222 filed Apr. 27, 1990. These inventions are based on determining a binarizing threshold value by applying predetermined weighting to plural binarized data and by determining the average density around the object pixel, effecting the binary digitization utilizing said threshold value, and diffusing the error generated in said digitization into pixel data not yet binarized. These methods, relying on binary digitization based on the average density, can reduce the number of pixels into which the error is diffused in comparison with the error diffusion method, thereby significantly reducing the amount of processing.

However, the image processed by these methods is associated, as in the case of said error diffusion method, with drawbacks such as formation of white dots, granular noises or pseudo contours.

SUMMARY OF THE INVENTION

In consideration of the foregoing, an object of the present invention is to provide an image processing method capable of reducing the amount of processing required for binary digitizing and also of providing a reproduced image of high quality irrespective of the state of the input image, and an image processing apparatus therefor.

Another object of the present invention is to provide an image processing method for binary digitization utilizing the average density around the object pixel as the threshold pixel, and capable of providing a reproduced image of high quality, and an apparatus therefor.

Still another object of the present invention is to provide an image processing method capable, with a simple structure, of preventing the formation of a dot-free white area in the edge portions and in the low density area in the initial part of processing, thereby providing a reproduced image of high quality, and an apparatus therefor.

Still another object of the present invention is to provide an image processing method capable, with a simple structure, of preventing formation of granular noises and pseudo contours, and an apparatus therefor.

The foregoing and still other objects of the present invention will become fully apparent from the following detailed description which is to be taken in conjunction with the attached drawings.

According to an embodiment of the present invention, an image processing apparatus includes input means for sequentially inputting image data of an object pixel to be binary-digitized calculation means for calculating, an average density, based on binarized data positioned around the object pixel, threshold value setting means for adding a predetermined correction signal to the average density calculated by the calculation means, thereby setting a threshold value, the predetermined correction signal being a signal which varies every time the pixel to be binary-digitized varies and binarization means for effecting binary digitization according to the threshold value set by the threshold value setting means.

BRIEF DESCRIPTION OF THE DRAWINGS

FIG. 2 is a block diagram of a binarizing circuit in FIG. 1;

FIG. 9 is a block diagram of a window judgment circuit;

DESCRIPTION OF THE PREFERRED EMBODIMENTS

Now the present invention will be clarified in detail by preferred embodiments thereof shown in the attached drawings.

[First embodiment]

Figure 1:
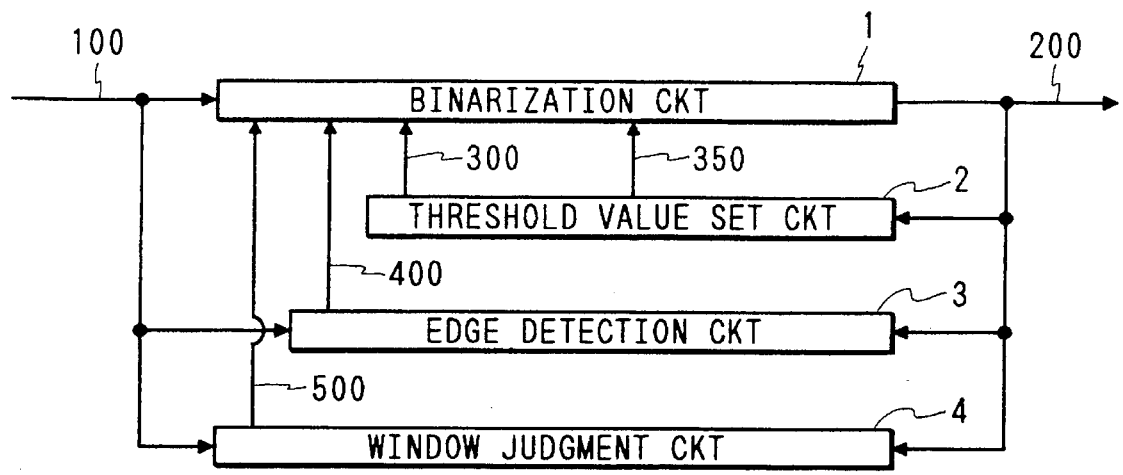
FIG. 1 is a block diagram of a binarizing apparatus constituting a first embodiment of the present invention.

FIG. 1 is a schematic block diagram of a binarizing apparatus constituting a first embodiment of the present invention. A binarization circuit 1 effects binary digitization of digital data, representing densities of 8 bits (256 levels), entered through a data line 100, based on information from a threshold value setting circuit 2, an edge detection circuit 3 and a window judgment circuit 4 to be explained later, and releases a binarized signal "1" (black) or "0" (white) on a data line 200. The threshold value setting circuit 2 refers to an area consisting of already binarized pixels around the object pixel, calculates the average density weighted by a weighting mask corresponding to said area, and releases a threshold value, obtained by adding a correction signal to be explained later to said average density, to a data line 300.

The edge detection circuit 3 compares the entered density of the object pixel with the average density of the already binarized pixels around the object pixel, thereby discriminating whether said object pixel is on an edge, and releases a signal corresponding to the result of said discrimination to a signal line 400. The window judgment circuit 4 refers to an inspection area (window area) consisting of the already binarized pixels around the object pixel, based on the signal from the binarization circuit 1 (on signal line 200) and the density of the object pixel (on signal line 100), discriminates whether a black dot "1" is present in said area, and releases the result of said discrimination to a signal line 500 for feedback to the binarization circuit 1.

In the following there will be explained the structures of the circuits 1–4 in the present embodiment and the functions thereof.

At first, reference is made to a block diagram in FIG. 2, for explaining the structure of the binarization circuit 1 mentioned above.

In FIG. 2, there are shown flip-flops 11a–11d for data latching; adders 12a–12d for adding errors 160–190 distributed by an error distribution control circuit 16 to be explained later; a line memory 13 for one line delay; a comparator 14; an AND gate 15; and an error distribution control circuit 16.

Data entered through the data line 100 (original image density data corresponding to an object pixel position [i, j]) is added in the adder 12d to the sum of errors distributed to said pixel position. The added data are supplied through a signal line 120 to the comparator 14 and the error distribution control circuit 16. The comparator 14 compares the data on said signal line 120 with the threshold value data supplied through the signal line 300 from the threshold value setting circuit 2, and releases a signal "1" or "0" to a signal line 140 respectively if the former is larger or otherwise.

The AND gate 15 forms the logic product of the binarized signal (on signal line 140) and the signal from the window judgment circuit 4 (on signal line 500), and releases said product as the binarized data to the signal line 200. The signal released from the window judgment circuit 4, to be explained in detail later, assumes a level "0" if the object pixel has a low density and an inspection area (window area) consisting of already binarized data around the object pixel contains a black dot "1", and assumes a level "1" otherwise. Consequently the result of binarization is always "white" if the object pixel has a low density and the window area contains a black dot.

The error distribution control circuit 16 calculates the difference between the signal 120 before the binarization and the signal 350 from the threshold value setting circuit 2, representing the average density of the binary data around the object pixel, as the error, and determines errors 160–190 to be distributed to the surrounding pixels, according to the sign of said error and the signal 400 from the edge detection circuit.

Figure 3:
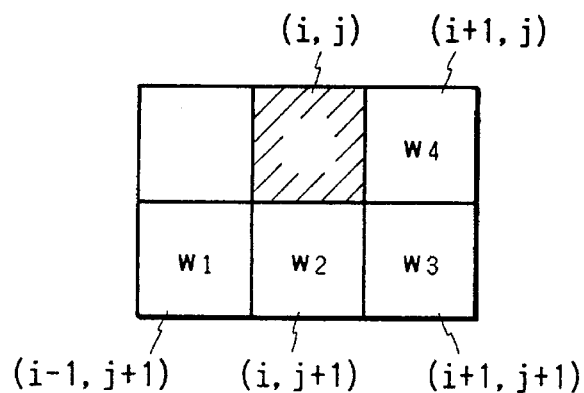
FIG. 3 is a view showing the relationship between an object pixel and pixels in which the error is distributed.

As shown in FIG. 3 in which the object pixel position is indicated by (i, j), the error amount signals 160–190 are added, respectively in the adders 12a– 12d, to the errors already distributed to the surrounding pixels (i−1, j+1), (i, j+1), (i+1, j+1) and (i+1, j). In this embodiment the errors are distributed in four pixels around the object pixel, but such number is not limitative and can be increased or decreased in the same principle.

In the following there will be explained details of the error distribution control circuit 16 with reference to FIG. 4.

Figure 4:
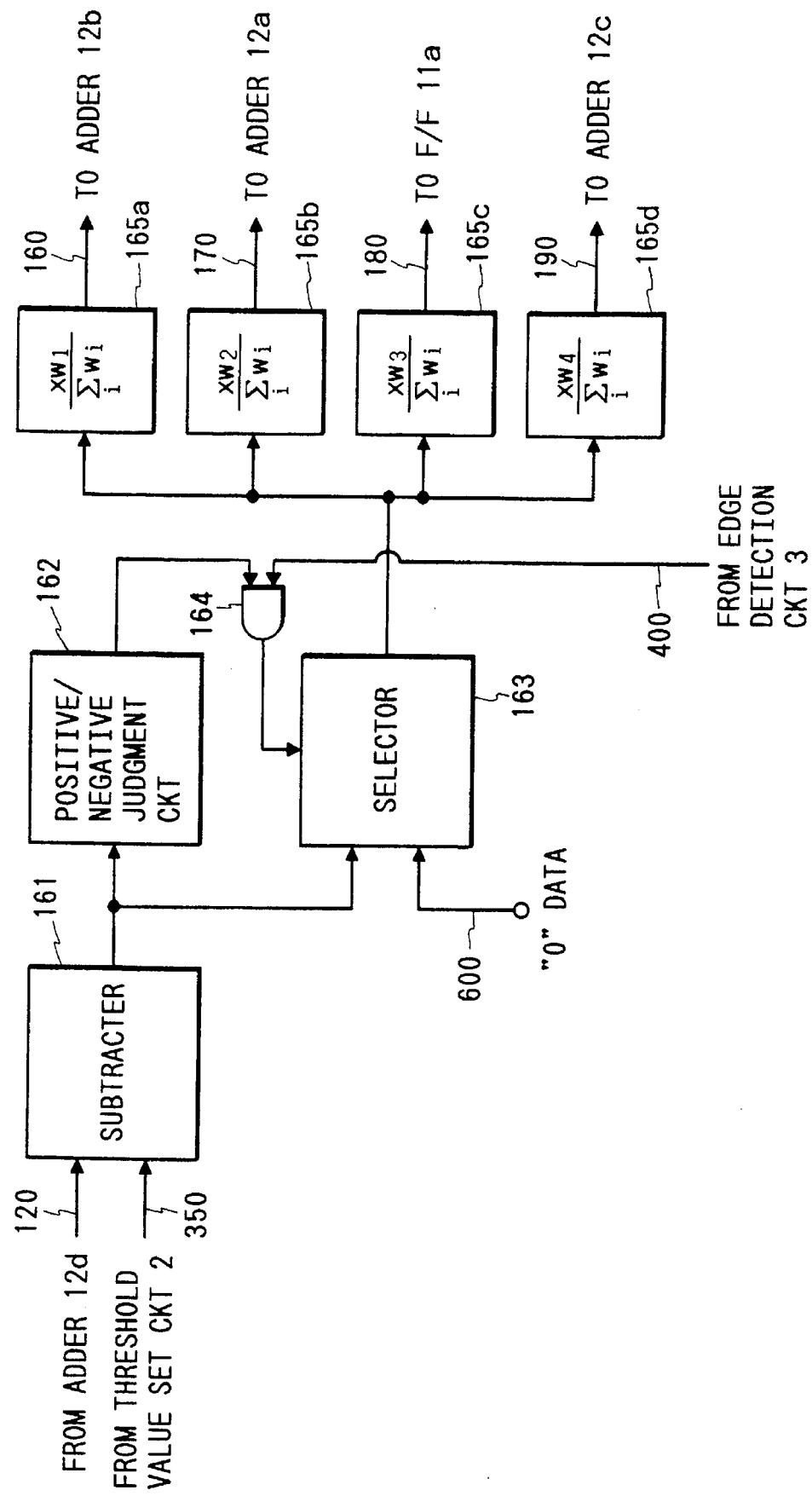
FIG. 4 is a block diagram of an error distribution control circuit shown in FIG. 2.

In FIG. 4 there are shown a subtracter 161; a positive/negative judgment circuit 162 for discriminating the sign of the input signal; a selector 163; an AND gate 164; and multipliers 165a–165d for effecting predetermined multiplications. The subtracter 161 calculates the difference between the signal 120 before the binarization (having a value from 0–255) and the signal 350 from the threshold value setting circuit 2, representing the average density of the already binarized pixels around the object pixel, namely ((signal 120)−(signal 350)), and sends the obtained results to the positive/negative judgment circuit 162 and the selector 163.

The positive/negative judgment circuit 162 releases a signal "0" if the input data are positive or zero, or a signal "1" if the input data are negative. The AND gate 164 forms the logic product of the signal from the positive/negative judgment circuit 162 and the output signal 400 from the edge detection circuit 3, and sends the obtained result to the selector 163. The signal from the edge detection circuit 3, which will be explained in detail later, assumes a level "1" if the object pixel is identified as being on an edge, or a level "0" otherwise. Consequently the output signal of the AND gate 164 assumes a level "1" if the error resulting from the aforementioned binary digitization is negative and the object pixel is identified as being on an edge, or a level "0" otherwise.

The selector 163 selects the signal 600 (logic level "0") if the output of the AND gate 164 is "1", or distributes the error obtained from the subtracter 161 to the multipliers 165a–165d if said output of the AND gate 164 is "0". As shown in FIG. 3, the multipliers 165a–165d respectively correspond, with respect to the object pixel (i, j), to the surrounding pixels (i−1, j+1), (i, j+1), (i+1, j+1), (i+1, j) with weights $w_1$–$w_4$, and effect multiplications in the following manner for supply of the results to signal lines 160, 170, 180 and 190. Said multiplication is conducted, for example, as follows:

(signal on line 160) = (selector output)

$$x \; w_1 / \sum_{i=1}^{4} w_i$$

When the output of the AND gate 164 is "1", the signal line 600 (logic level "0") is selected, so that the distributed errors to the surrounding pixels are all zero.

The above-explained process does not distribute the negative error at the edge to the surrounding pixels, and is therefore capable of preventing the "white area formation without dot" encountered in the low density area at the edge.

Figure 6:
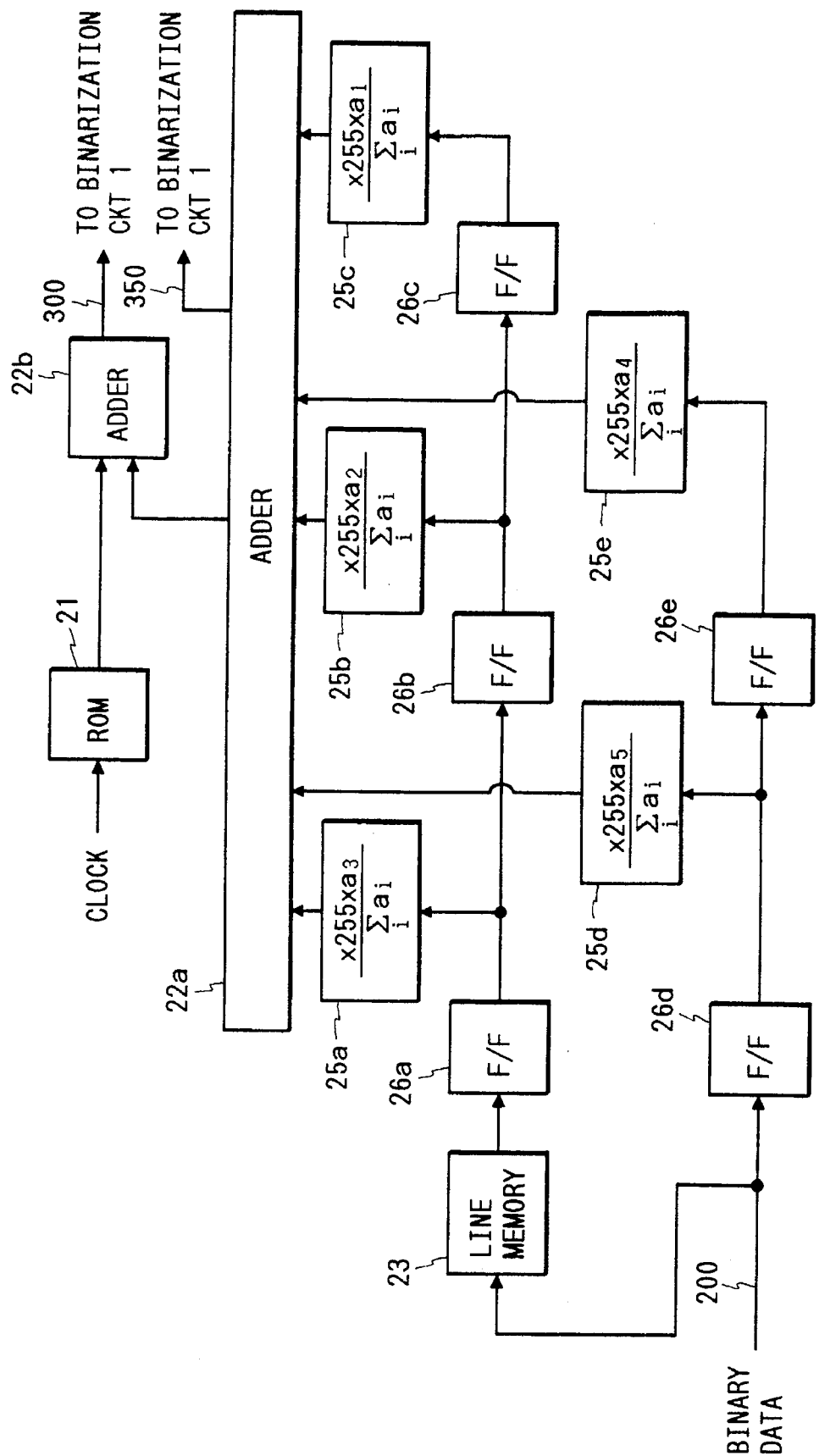
FIG. 6 is a block diagram of a threshold value setting circuit shown in FIG. 1.

FIG. 6 shows the structure of the threshold value setting circuit 2 of the present embodiment, and the function of said circuit will be explained in the following with reference to FIG. 6.

There are shown a ROM 21 storing dither signals to be added to the threshold value; adders 22a, 22b; a line memory 23 for one line delay; multipliers 25a–25e for multiplying input data with constants; and flip-flips 26a–26e for data latching.

In the present circuit, a binarized signal "1" (black) or "0" (white) is supplied from the data line 200 to the line memory 23 and the latch 26d.

Figure 5:
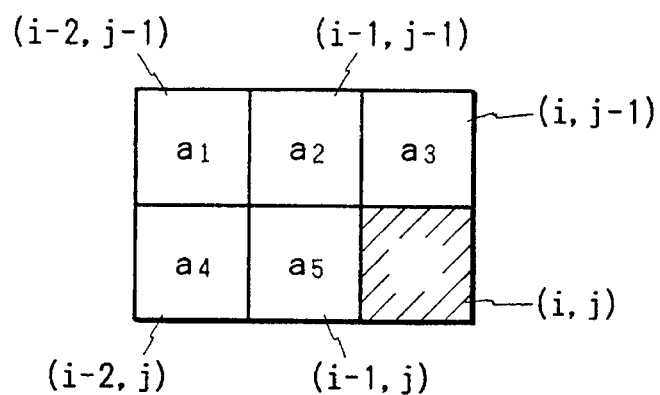
FIG. 5 is a view showing the relationship between the object pixel and pixels used for calculating the average density.

For the object pixel (i, j) in FIG. 5, each of the latches 26a–26e stores a signal "1" (black) or "0" (white) respectively corresponding to pixel positions (i, j−1), (i−1, j−1), (i−2, j−1), (i−1, j) and (i−2, j). These signals are weighted by the multipliers 25a–25e and are supplied to the adder 22a. The weights for the surrounding pixels are as shown in FIG. 6, so that the inputs to the adder 22a are:

$$255 \times a_1 \times (\text{output of } 26c) / \sum_{i=1}^{5} a_i,$$

$$255 \times a_2 \times (\text{output of } 26b) / \sum_{i=1}^{5} a_i,$$

...

$$255 \times a_5 \times (\text{output of } 26d) / \sum_{i=1}^{5} a_i.$$

The output of the adder 22a is supplied through a signal line 350 to the error distribution control circuit 16. Said output is the average density of the already binarized pixels around the object pixel, and represents the density status of the pixels around the object pixel.

The ROM 21, storing dither signals (correction signals) to be added to the threshold value, releases values from "−8" to "+8" one by one in synchronization with clock signals. The obtained output signals are supplied to the adder, which calculates the sum with the data weighted by the aforementioned multipliers 25a–25e, and said sum is released to the data line 300 as the threshold value to be used in the binarization circuit 1.

The above-explained control provides the threshold value on the data line 300 by calculating the average density of the binarized pixels around the object pixel, and by adding dither signals for suppressing the texture formation in the uniform density area.

In this embodiment, the dither signals stored in the ROM 21 are from "−8" to "+8", but such dither signals are not limitative, and may also be replaced by uniform random numbers.

Also in this embodiment, the threshold value is calculated utilizing 5 binarized pixels around the object pixel, but the number of such pixels is not limitative and may be increased or decreased.

Figure 8:
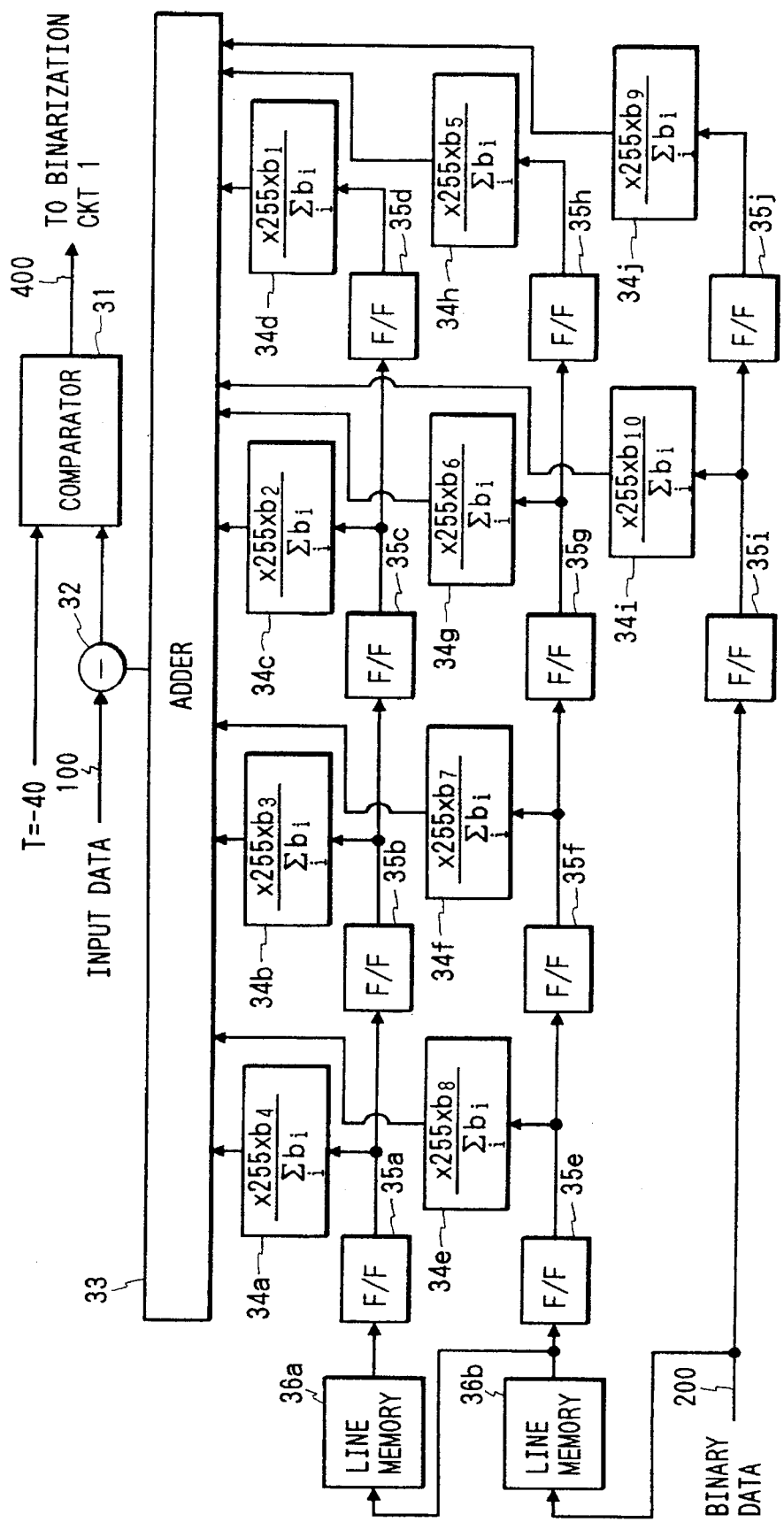
FIG. 8 is a block diagram of an edge detection circuit shown in FIG. 1.

FIG. 8 is a block diagram of the edge judgment circuit 3 in the present embodiment.

In FIG. 8, there are shown a comparator 31; a subtracter 32, an adder 33; multipliers 34a–34j for multiplying input data with constants; flip-flops 35a–35j for data latching; and line memories 36a, 36b for one line delay.

In this circuit, binarized data of "1" (black) or "0" (white) are supplied through the data line 200 to the line memory 36b and the latch 35i. For the object pixel at (i, j), the latches 35a–35j store binarized data respectively corresponding, as shown in FIG. 7, to pixels (i+1, j−2), (i, j−2), ..., (i−2, j−2), (i+1, j−1), ..., (i−2, j−1), (i−1, j) and (i−2, j), and these data are weighted by the multipliers 37 and 34a–34j for supply to the adder 33.

Figure 7:
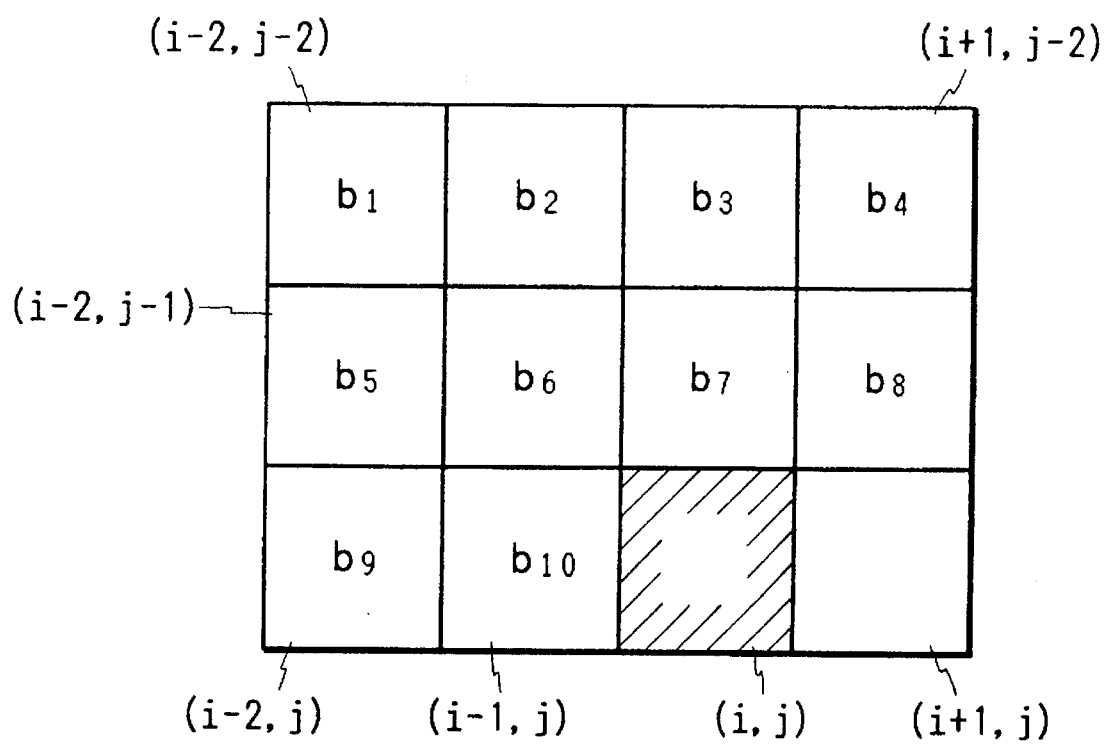
FIG. 7 is a view showing the relationship between the object pixel and pixels used for edge detection.

The weightings for the surrounding pixels are as shown in FIG. 7, and inputs to the adder 33 are given by:

$$255 \times b_1 \times (\text{output from } 35d) / \sum_{i=1}^{10} b_i,$$

$$255 \times b_2 \times (\text{output of } 35c) / \sum_{i=1}^{10} b_i, \ldots$$

$$255 \times b_{10} \times (\text{output of } 35i) / \sum_{i=1}^{10} b_i.$$

The adder 33 calculates the sum which is supplied, as the average density around the object pixel, to the subtracter 32. The subtracter 32 calculates the difference between the original density of the object pixel (on signal line 100) and the average density around the object pixel, supplied from the adder 33, and sends said difference to the comparator 31, which compares said difference with a predetermined edge threshold value T (=−40 in this embodiment), and releases a signal "0" if the former is larger, or a signal "1" otherwise (edge identified). Thus an edge is identified when the density of the object pixel is significantly lower than the average density therearound (corresponding to a case of an abrupt change from a high density to a low density), whereby the error diffusion in the binarization circuit 1 is controlled to prevent white area formation conventionally encountered in the low density area at the edge. Also in the present embodiment, the edge detection can be conducted precisely, as it is conducted with a weighting mask different from that used for calculating the average density for determining the binarizing threshold value.

FIG. 9 is a block diagram of the window judgment circuit 4 in the present embodiment.

There are shown a look-up table (LUT) 41 for providing a switching signal corresponding to the density signal supplied through the signal line 100; a selective OR circuit 42 for effecting selective logic summation according to the output signal from the LUT 41; OR circuits 43a, 43b; delay memories 44a, 44b for a line delay; and flip-flops 45a–45l for data latching.

In the present circuit, the binary data from the data line 200 are supplied to the line memory 44b and also latched in the latch 45k. The data read from the line memory 44b in first-in-first-out manner are supplied to the line memory 44a and also latched in the latch 45f. Thus for an object pixel (i, j) to be processed, the latches store the binarized data of surrounding 12 pixels at (i–2, j–2), (i–1, j–2), (i, j–2), (i+1, j–2), (i+2, j–2), (i–2, j–1), (i–1, j–1), (i, j–1), (i+1, j–1), (i+2, j–1), (i–2, j) and (i–1, j).

The OR circuit 43b releases a signal 420 by OR operation on the binarized data of 4 pixels at (i–1, j–1), (i, j–1), (i+1, j–1) and (i–1, j).

Also the OR gate 43a releases a signal 430 by OR operation on the binarized data of 8 pixels at (i–2, j–2), (i–1, j–2), (i, j–2), (i+1, j–2), (i+2, j–2), (i–2, j–1), (i+2, j–1) and (i–2, j).

On the other hand, the look-up table 41 releases the switch signal 410 of three levels according to the entered density signal 100. More specifically, the switch signal 410 assumes a level "0" when the density signal 100 is from "1" to "20", a level "2" when the density signal is from "21" to "50", or a level "1" when the density signal is "51" or higher or "0". The selective OR circuit 42 releases, as a judgment signal 500, a signal "1" if the switch signal 410 from the LUT 41 is "1", an inverted signal of the signal 420 from the OR gate 43b if said switch signal is "0", or an inverted signal or an OR signal obtained from the signal 420 and the signal 430 from the OR gate 43a. Thus, depending on the density signal 100, the referred areas are selected in three levels, and the presence of black dot "1" is checked in each referred area.

In the above-explained example, the judgment signal 500 becomes unconditionally "1" when the density signal is "0", or "51" or larger. Reference is made in the surrounding 12 pixels in case the density signal 100 is from "1" to "20", or in the surrounding 4 pixels in case the density signal 100 is from "21" to "50", and, if at least a black dot "1" is present, the signal 420 or 430 becomes "1" so that the judgment signal 500 assumes a level "0". Otherwise the judgment signal 500 becomes "1".

The number of levels of the referred areas can be increased, if necessary, by increasing the line buffers, latches and OR gates. For example the referred areas of 4 levels can be obtained in the following manner.

For an object pixel to be processed at (i, j), there are provided line buffers and latches for storing the binarized data of the surrounding 24 pixels at (i–3, j–3), (i–2, j–3), (i–1, j–3), (i, j–3), (i+1, j–3), (i+2, j–3), (i+3, j–3), (i–3, j–2), (i–2, j–2), (i–1, j–2), (i, j–2), (i+1, j–2), (i+2, j–2), (i+3, j–2), (i–3, j–1), (i–2, j–1), (i–1, j–1), (i, j–1), (i+1, j–1), (i+2, j–1), (i+3, j–1), (i–3, j), (i–2, j) and (i–1, j).

There are also provided three OR gates a–c and a selective OR gate d.

Figure 10:
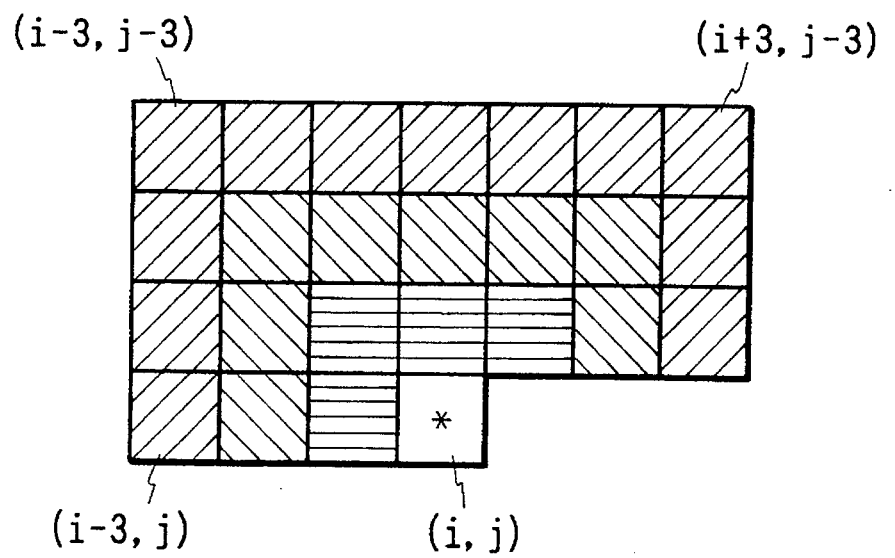
FIG. 10 is a view showing a pixel reference area in the window judgment circuit.

In such an arrangement, the OR gate a releases a signal e by logic summation of the binarized data of four pixels, indicated by horizontal lines in FIG. 10, at (i–1, j–1), (i, j–1), (i+1, j–1) and (i–1, j). The OR gate b releases a signal f by logic summation of the binarized data of eight pixels, indicated by lines from lower right to upper left in FIG. 10, at (i–2, j–2), (i–1, j–2), (i, j–2), (i+1, j–2), (i+2, j–2), (i–2, j–1), (i+2, j–1) and (i–2, j). The OR gate c releases a signal g by logic summation of the binarized data of twelve pixels, indicated by lines from lower left to upper right in FIG. 10, at (i–3, j–3), (i–2, j–3), (i–1, j–3), (i, j–3), (i+1, j–3), (i+2, j–3), (i+3, j–3), (i–3, j–2), (i+3, j–2), (i–3, j–1), (i+3, j–1) and (i–3, j).

Thus the selective OR gate d releases, as a judgment signal 500, an inverted signal of the signal e if the density signal 100 is from "1" to "50"; an inverted signal of the logic summation of the signals e and f if the density signal is from "11" to "20"; an inverted signal of the logic summation of the signals e, f and g if the density signal is from "1" to "10"; or a signal "1" if the density signal is "51" or higher or "0".

It is therefore easily possible to select density levels in arbitrary manner, thereby selecting the reference pixel area in arbitrary manner.

As explained in the foregoing, the present embodiment is capable of preventing the dot connection in the low density area of the binary image.

The above-explained error distribution control circuit does not distribute the error only when the error obtained from the subtracter 161 is negative and the edge detection circuit releases an output signal "1" (namely when the object pixel density minus the binary average density is not larger than the edge threshold value [T=–401]), but there may also be employed other methods.

For example, the error distribution may be suspended only when the edge detection circuit releases an output signal "1", regardless of the sign of the error from the subtracter 161. This can be achieved, in FIG. 4, by eliminating the positive/negative judgment circuit 162 and the AND gate 164, connecting the signal line 400 to the input terminal of the selector 163, and supplying the output of the subtracter 161 only to the selector 163.

Also the edge detection circuit may be so constructed that the signal 400 assumes the level "1" when the absolute value of the difference between the object pixel density and the binary average density is larger than the edge threshold value. This is achieved, in the circuit shown in FIG. 8, by providing an absolute value circuit between the subtracter 32 and the comparator 31, employing an edge threshold value signal [T=40], and causing the comparator 31 to release a signal "1" when the output of said absolute value circuit is larger than the edge threshold value or a signal "0" otherwise.

Also in the present embodiments, latches for holding binary data are separately provided in the threshold value setting circuit 2, edge detection circuit 3 and window judgment circuit 4, but these latches may be provided in one place for cost reduction.

Such structure can be easily realized by obtaining necessary part of the binary data in said latches by each circuit.

The present embodiment is designed to handle monochromatic image data, but also in a color image processing system for color data consisting of Y (yellow), M (magenta), C (cyan) and K (black), the present invention can be applied to the data of each color without detrimental effect.

As explained in the foregoing, the present embodiment can reduce the amount of data processing, by determining the binarizing threshold value by means of binarized data. It can also suppress the formation of white area and granularity in the low density area, improve the image reproducibility in the edge area, and prevent the formation of pseudo contours by texture in the uniform density area, thereby providing a reproduced image of high quality regardless of the state of the input image.

[Second embodiment]

In the following there will be explained a second embodiment in which the edge detection method is partly modified. Said second embodiment is rendered capable of precisely judging whether the input image is at an edge portion, with a simplified structure, by employing the average density, used in the binarizing threshold value, for the edge detection and effecting the edge detection by comparing the data of the object pixel prior to the error correction with the average density (threshold value) of the binarized pixels.

Figure 11:
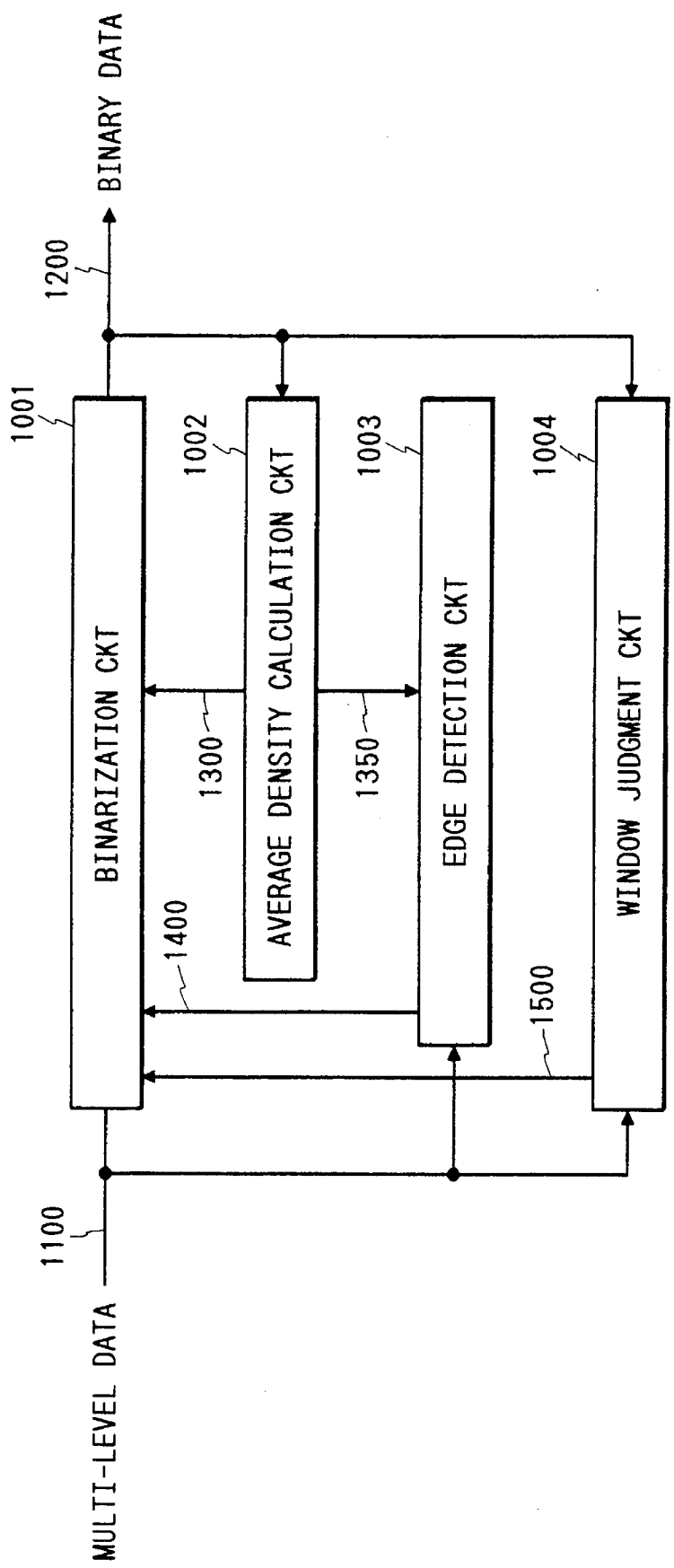
FIG. 11 is a block diagram of an entire binarizing apparatus constituting a second embodiment of the present invention.

FIG. 11 is a block diagram of a binarization device in the second embodiment.

In FIG. 11 there are shown a data line 1100 for the input to the device of the present embodiment of digital data representing density levels of 8 bits (256 levels); and a binarization circuit 1001 for effecting binary digitization of said 8-bit data supplied from said data line 1100, based on the information from an average density calculating circuit 1002, an edge detection circuit 1003 and a window judgment circuit 1003 to be explained later, and releasing binarized data "1" (black) or "0" (white) to a data line 1200.

The average density calculation circuit 1002 refers to a predetermined area consisting of already binarized pixels around the object pixel, calculates the average density weighted by a weighting mask corresponding to said area, and releases the thus obtained average density as the threshold value to a data line 1300. The edge detection circuit 1003 discriminates whether the object pixel is on an edge by comparing the multi-value density data of said object pixel with the average density 1350 of the binarized pixels around the object pixel, calculated by the average density calculation circuit 1002, and releases a signal corresponding to the result of said discrimination to a signal line 1400. The window judgment circuit 1004 refers to an inspection area (window area) consisting of the binarized pixels around the object pixel, based on the binarized signal (1200) supplied from the binarization circuit 1001 and the input signal (1100) of multi-level density of the object pixel, discriminates whether a black dot "1" is present in said window area, and releases a signal corresponding to the result of said discrimination to a signal line 1500 for feedback to the binarization circuit 1001.

In the following there will be explained the details of each of the circuits in the present embodiment.

Figure 12:
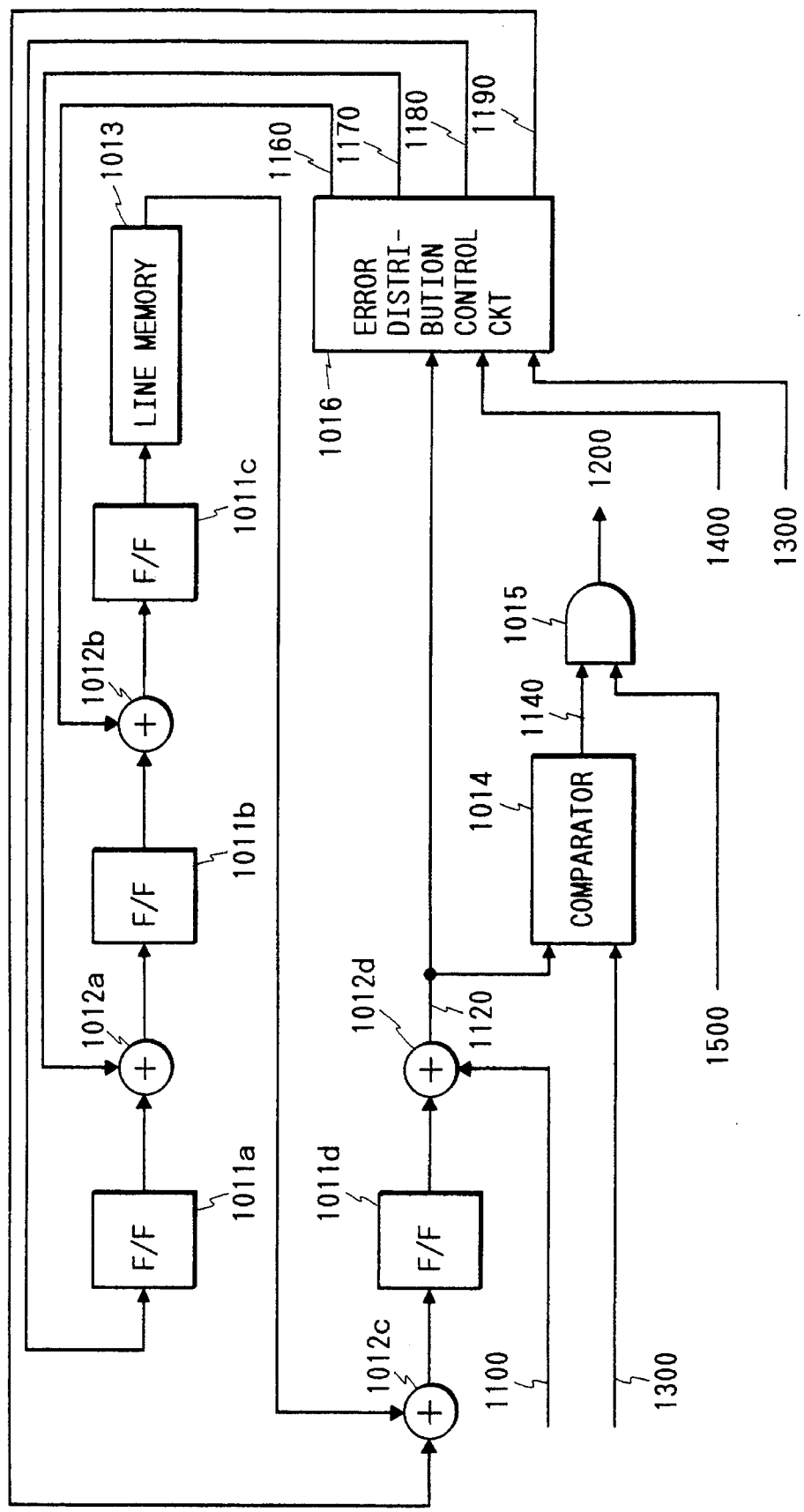
FIG. 12 is a detailed block diagram of a binarizing circuit in said second embodiment.

FIG. 12 shows the details of the binarization circuit 1001 shown in FIG. 11.

In FIG. 12 there are shown flip-flops 1011a–1011d for data latching; adders 1012a–1012d; a line memory 1013 for one line delay; a comparator 1014; an AND gate 1015; and an error distribution control circuit 1016.

Input data supplied through the data line 1100 (original image density data corresponding to the object pixel position (i, j)) are added in the adder 1012d to the sum of errors distributed to said pixel position, and the obtained sum is supplied through a signal line 1120 to the comparator 1014 and the error distribution control circuit 1016. The comparator 1014 compares said data on the signal line 1120 with the threshold value data from the average density calculation circuit. 1002 (signal line 1300), and releases a signal "1" or "0" to a signal line 1140 respectively if the former is larger or smaller than the latter.

The AND gate 1015 forms the logic product of the binarized signal (signal line 1140) and the signal (signal line 1150) from the window judgment circuit 1004, and releases said logic product as binarized data on a signal line 1200.

The signal from the window judgment circuit 1004, as will be explained later in more detail, assumes a level "0" if the object pixel has a low density and if the inspection (window) area consisting of the binarized data around the object pixel contains a black dot "1", or a level "1" otherwise. Consequently the binarization always gives a result "white" when the object pixel has a low density and the window area contains a black dot. The error distribution control circuit calculates, as the error, the difference between the signal 1120 prior to binary digitizing and the signal 1300 supplied from the average density calculation circuit 1002 and representing the average density of the binarized data around the object pixel, and controls the error amounts 1160–1190 to be distributed to the surrounding pixels, based on the sign of said error and the signal 1400 from the edge detection circuit 1003.

The error amount signals 1160–1190 are added in the adders 1012a–1012d to the already distributed errors in the surrounding pixels at (i–1, j+1), (i, j+1), (i+1, j+1) and (i+1, j) wherein the object pixel positioned at (i, j).

In the present embodiment, the errors are distributed to 4 pixels around the object pixel, but such number of pixels is not limitative and can be easily increased or decreased.

The details of the error distribution control circuit 1016 will not be explained as said circuit is identical with that described earlier in the first embodiment, and as shown in FIG. 4.

Figure 13:
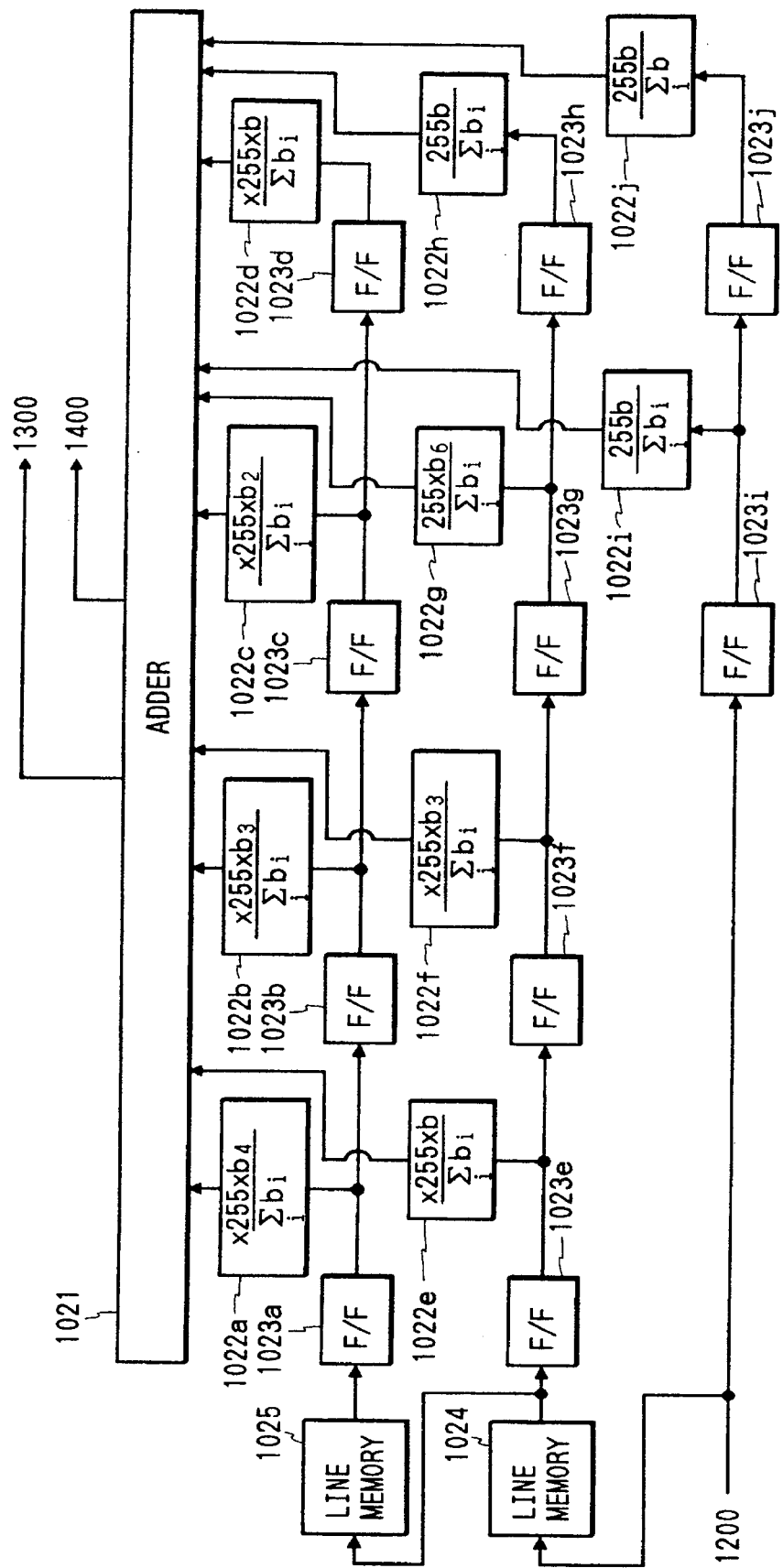
FIG. 13 is a detailed block diagram of an average density calculation circuit in said second embodiment.

FIG. 13 shows the details of the average density calculation circuit 1002 in FIG. 11.

There are shown an adder 1021; multipliers 1022a–1022j for multiplying the input data with constants; flip-flops 1023a–1023j for data latching; and line memories 1024, 1025 for storing input data of a line.

Binarized data of "1" (black) or "0" (white) are supplied from a data line 1200 to the line memory 1024 and the latch 1023i. The input data, delayed by a line in said line memory 1024, are supplied to the latch 1023e and the line memory 1025, and the input data further delayed by a line are supplied to the latch 1023a.

Thus, for an object pixel at (i, j) as shown in FIG. 7, the latches 1023a–1023j respectively store binarized data corresponding to positions (i+1, j–2), (i, j–2), ..., (i–2, j–2), (i+1, j–1), ..., (i–2, j–1), ... (i–2, j), and these data are supplied to the adder 1021 after weighting by the multipliers 1022a–1022j.

The weightings for the surrounding pixels are conducted as shown in FIG. 7, and the inputs to the adder 1021 are conducted as follows:

$$255 \times b_1 \times (\text{output from 23}d) / \sum_{i=1}^{10} b_i,$$

$$255 \times b_2 \times (\text{output from 23}c) / \sum_{i=1}^{10} b_i, \ldots$$

$$255 \times b_{10} \times (\text{output from 23}i) / \sum_{i=1}^{10} b_i.$$

The adder calculates the total sum, as the average density around the object pixel and sends it to signal lines 1300 and 1350.

Figure 14:
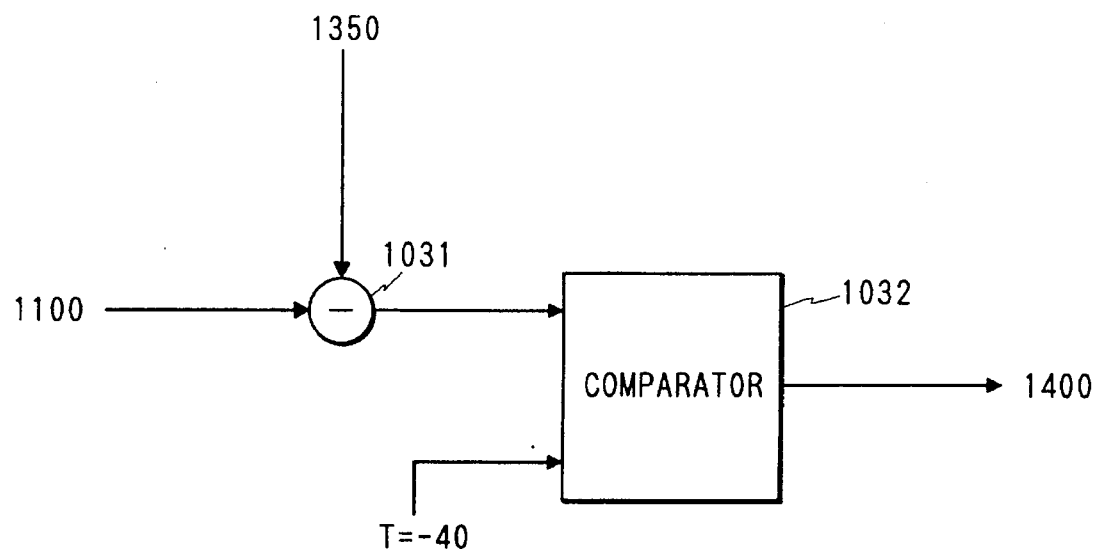
FIG. 14 is a detailed block diagram of an edge detection circuit in said second embodiment.

FIG. 14 shows the details of the edge judgment circuit shown in FIG. 11.

There are shown a subtracter 1031 and a comparator 1032.

The subtracter 1031 calculates the difference between the original density of the object pixel (signal line 1100) and the average density around the object pixel (signal line 1350)

obtained from the average density calculation circuit 1002, for supply to the comparator 1032.

The comparator 1032 compares said difference and a predetermined edge threshold value T (=−40 in this embodiment), and releases an output signal "0" if the former is larger, or "1" otherwise (when an edge is identified). Thus an edge is identified when the density of the object pixel is significantly lower than the average density therearound (corresponding to an abrupt change from a high density to a low density). Thus the error diffusion in the binarization circuit 1 is controlled to prevent the formation of the white area conventionally encountered in the low density area at the edge.

The details of the window judgment circuit 4 will not be explained since said circuit is identical with that described above in the first embodiment, and as shown in FIG. 9.

As explained in the foregoing, the second embodiment of the present invention can satisfactorily detect the image edge, by an edge detecting operation utilizing the data of the object pixel before the density correction and also utilizing the threshold value for binary digitizing. It is therefore rendered possible to prevent formation of a dot-free white area at the edge portion of an image or in the low density area at the initial stage of processing, thereby obtaining a reproduced image of high quality.

In the following there will be explained another method of edge detection as a third embodiment.

[Third embodiment]

In the first and second embodiments explained above, the edge detection circuit performs edge detection by weighting of an area. The edge detection may however be conducted also by employing two or more areas instead of said one area, and individually weighting the average densities of such plural areas.

Figure 15:
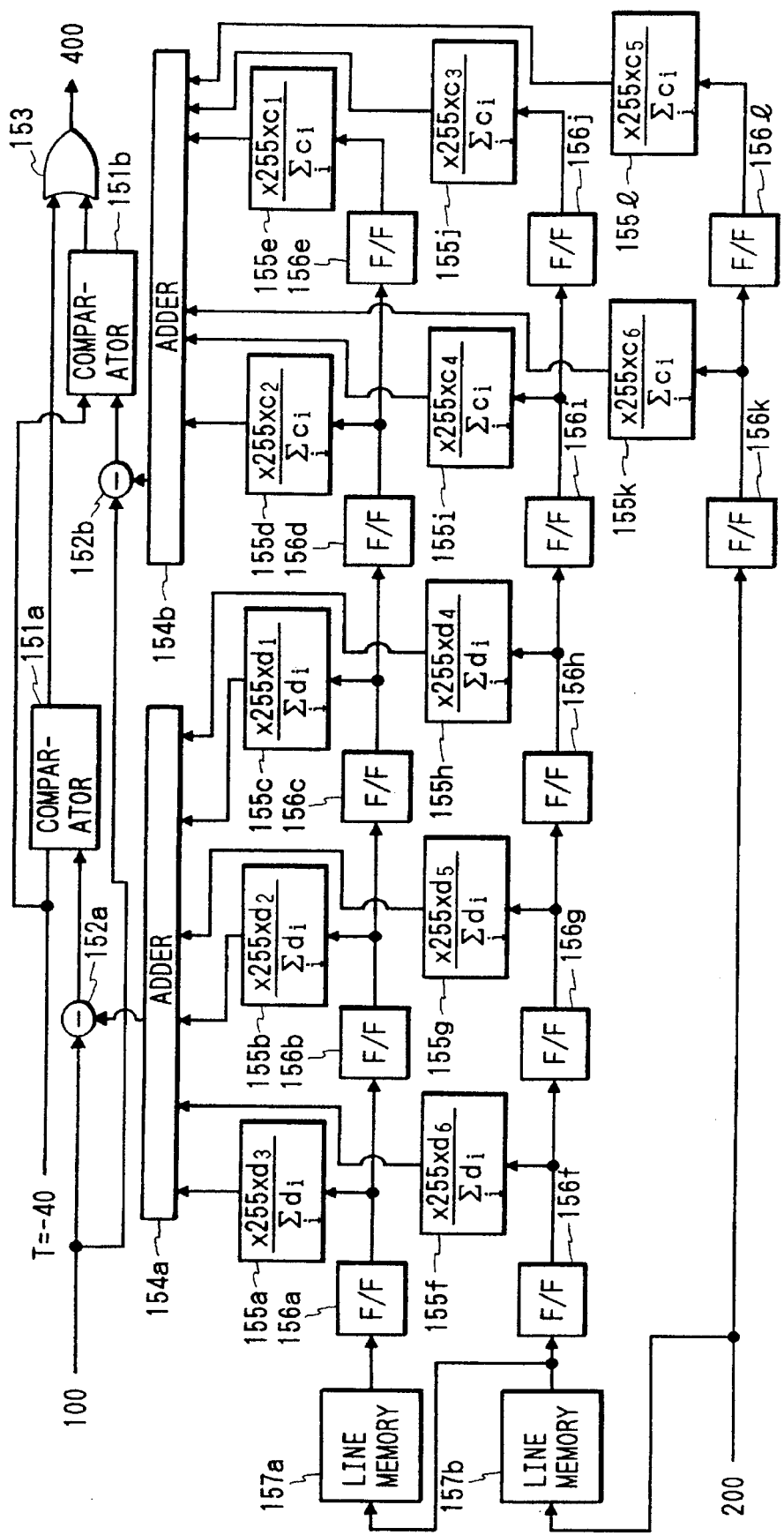
FIG. 15 is a detailed block diagram of an edge detection circuit in a third embodiment of the present invention.

FIG. 15 shows the details of an edge detection circuit of the third embodiment, employing two areas.

Figure 16:
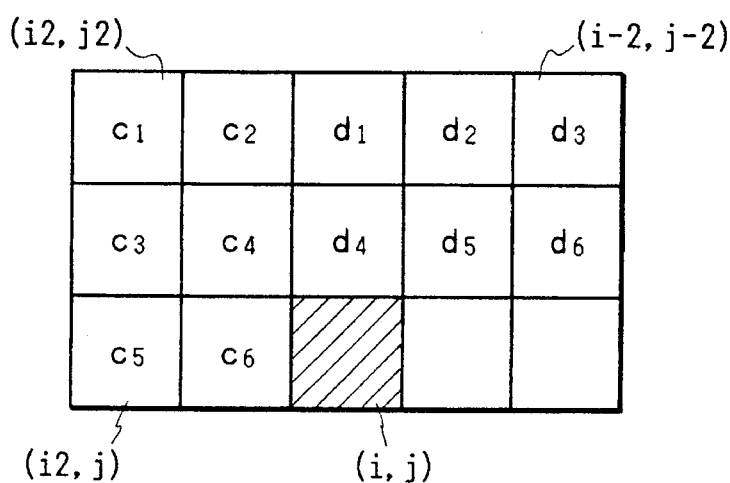
FIG. 16 is a view of a pixel reference area in the edge detection circuit shown in FIG. 15.

The circuit shown in FIG. 15 employs, as shown in FIG. 16 with an object pixel at (i, j), an area consisting of 6 pixels at (i−2, j −2), (i−1, j −2), (i−2, j−1), (i−1, j−1), (i−2, j) and (i−1, j), and another area of 6 pixels at (i, j−2), (i+1, j−2), (i+2, j−2), (i, j−1), (i+1, j−1) and (i+2, j−1), then separately determines the average densities in respective areas by weightings with $c_1-c_6$ and $d_1-d_6$, compares each of said average densities with the density of the object pixel and identifies an edge if at least one of the results of comparison is smaller than the edge threshold value.

In this manner the edges of the vertical and horizontal directions can be detected with satisfactory sensitivity.

In the following the details of said third embodiment will be explained with reference to FIG. 15. The entire structure of said third embodiment is the same as that shown in FIG. 1.

In FIG. 15 there are shown comparators 151a, 151b; subtracters 152a, 152b; an OR gate 153; adders 154a, 154b; multipliers 155a–155l for multiplying the input data with constants; flip-flops 156a–156l for data latching; and line memories 157a, 157b for one line delay.

Binarized data are supplied through a data line 200 to the line memory 157b and the latch 56k. The input data, delayed by one line in the line memory 157b, are supplied to the latch 156f and the line memory 157a, and the input data further delayed by a line are supplied to the latch 156a.

As shown in FIG. 16 with the object pixel at (i, j), the latches 157a–157l respectively store binarized data corresponding to pixels at (i+2, j−2), (i+1, j−2), . . . , (i−2, j−2), (i+2, j−1), . . . , (i−2, j−1), . . . , (i−1, j), (i−2, j), among which the data of 6 pixels at (i, j−2), (i+1, j−2), (i+2, j−2), (i, j−1), (i+1, j−1) and (i+2, j−1) are weighted in succession by the multipliers 155c, 155b, 155a, 155h, 155g and 155f by:

$$255 \times d_1 \times (\text{output from } 156c) / \sum_{i=1}^{6} d_i,$$

$$255 \times d_2 \times (\text{output from } 156b) / \sum_{i=1}^{6} d_i, \ldots$$

$$255 \times d_6 \times (\text{output from } 156f) / \sum_{i=1}^{6} d_i,$$

for supply to the adder 154a. The adder 154a calculates the total sum of these values, and the subtracter 152a subtracts said total sum from the object pixel density (signal line 100) for supply to the comparator 151a.

The comparator 151a compares said value with a predetermined edge threshold value (T=−40), and releases a signal "0" if the former is larger, or "1" otherwise (edge identified).

On the other hand, the data of 6 pixels at (i−2, j−2), (i−1, j−2), (i−2, j−1), (i−1, j−1), (i−2, j) and (i−1, j) are similarly weighted by the multipliers 155e, 155d, 155j, 155i, 155l and 155k in succession as:

$$255 \times c_1 \times (\text{output from } 156e) / \sum_{i=1}^{6} c_i,$$

$$255 \times c_2 \times (\text{output from } 156d) / \sum_{i=1}^{6} c_i, \ldots$$

$$255 \times c_6 \times (\text{output from } 156k) / \sum_{i=1}^{6} c_i,$$

for supply to the adder 154b. The adder 154b calculates the total sum of these values, and the subtracter 152b subtracts said total sum from the object pixel density (signal line 100) for supply to the comparator 151b.

The comparator 151b compares this value with a predetermined edge threshold value (T=−40), and releases a signal "0" if the former is larger, or "1" otherwise (when edge identified).

The gate 153 forms the logic sum of the results of discrimination in two areas, and sends said sum to a data line 400. The above-explained process identifies the presence of an edge if the edge is identified in at least an area, whereupon the gate 153 releases a signal "1". A signal "0" is released if the edge is not identified in both areas.

In this manner the third embodiment can detect the edges in the vertical and horizontal directions with satisfactory sensitivity, and prevent the formation of a dot-free area in a low density area in the vicinity of an edge or in the initial stage of processing, thereby providing a reproduced image of high quality.

[Fourth embodiment]

A fourth embodiment of the present invention is featured by a modification in the threshold value setting circuit 2 in the first embodiment shown in FIG. 1. The binarization circuit, edge detection circuit and window judgment circuit are omitted from the following description as they are identical with those in the first embodiment.

Figure 17:
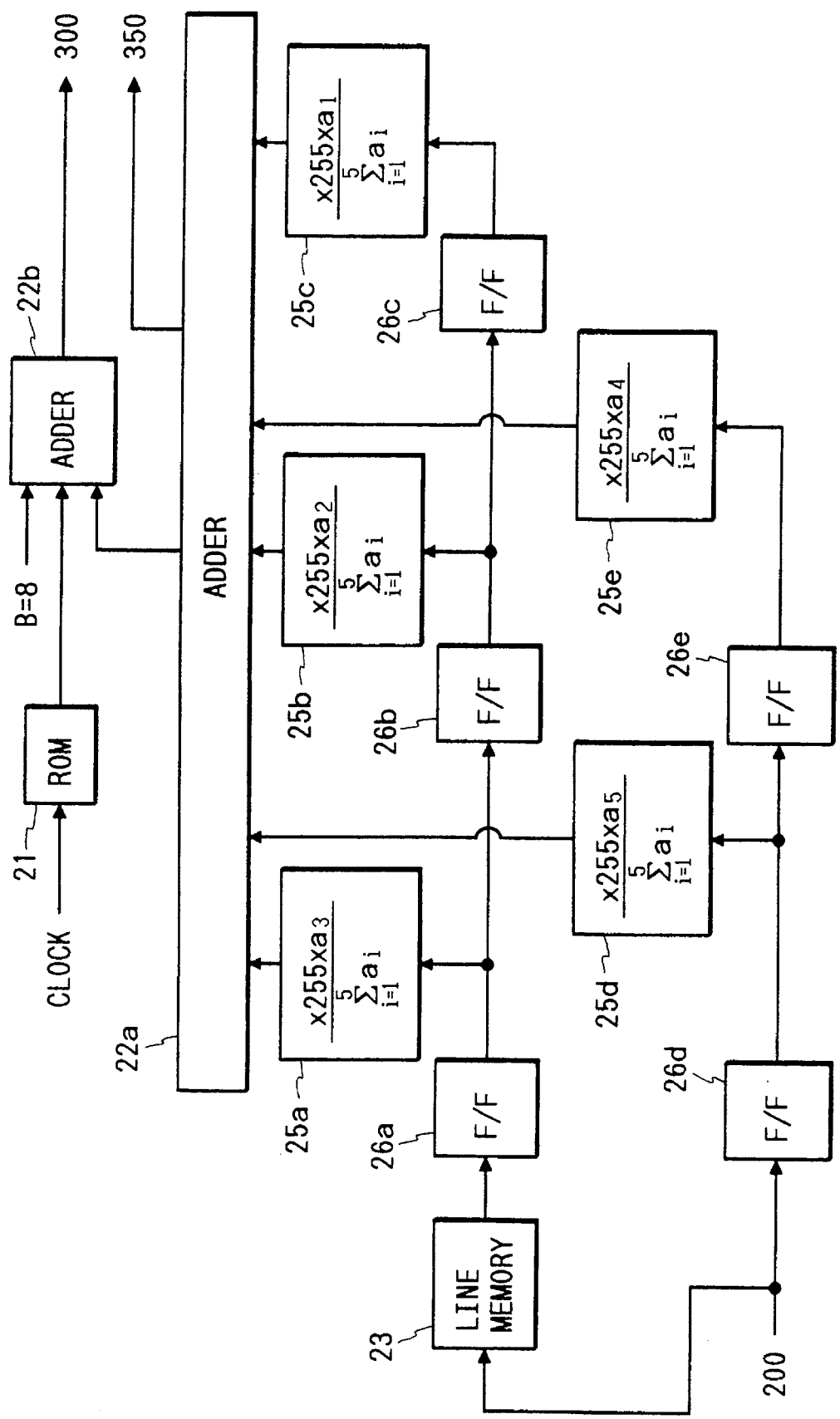
FIG. 17 is a detailed block diagram of a threshold value setting circuit in a fourth embodiment.

FIG. 17 shows the details of the threshold value setting circuit 2 in the fourth embodiment.

In FIG. 17, there are shown a ROM 21 storing dither signals to be added to the threshold value; adders 22a, 22b; a first-in-first-out (FIFO) memory 23 for one line delay; multipliers 25a–25e for multiplying input data with constants; and flip-flops 26a–26e for data latching.

In this threshold value setting circuit 2, binarized data of "1" (black) or "0" (white) are supplied through a data line 200 to the line memory 23 and the latch 23d.

As shown in FIG. 5 with an object pixel at (i, j), latches 26a–26e respectively store binarized data corresponding to pixels at (i–2, j–1), (i–1, j–1), (i, j–1), (i–2, j) and (i–1, j), which are weighted respectively by the multipliers 25a–25e for supply to the adder 22a.

The weightings are conducted as shown in FIG. 5 by:

$$255 \times a_1 \times (\text{output from } 26c) / \sum_{i=1}^{5} a_i,$$

$$255 \times a_2 \times (\text{output from } 26b) / \sum_{i=1}^{5} a_i,$$

. . .

$$255 \times a_5 \times (\text{output from } 26d) / \sum_{i=1}^{5} a_i$$

for supply to the adder 22a.

This value is a binary average density around the object pixel, and represents the state of image density around said object pixel.

The ROM 21 storing dither signals to be added to the threshold value releases values from "–8" to "+8" one by one in synchronization with clock signals. The adder 22b adds the binary average density around the object pixel obtained from the adder 22a, the signal from said ROM 21, and a constant bias value B=8, and the obtained sum is supplied to a data line 300 as the threshold value to be used in the binarization circuit 1.

The addition of a constant bias B=8 provides a positive threshold value even in the absence of pixels in the average density mask shown in FIG. 5 at an initial stage of processing, thereby preventing the drawback of black spots being generated in succession. Also the addition of the dither signals to the sum of the average density and the bias value allows to suppress the texture formation in a uniform density area.

The dither signals stored in the ROM are assumed to be from –8 to +8 in the foregoing explanation, but these values are not limitative but can be arbitrarily selected with similar effects. Also said dither signals may be replaced by uniform random numbers with an average of zero.

Also the bias signal B=8 supplied to the adder 22b may be replaced by dither signals from 0 to 16, or may further be replaced by uniform random numbers with an average of 8. Also said bias value 8 may be replaced by any positive number.

As explained in the foregoing, the fourth embodiment allows a positive binarizing threshold value by the addition of a predetermined bias value to the average density, even in the absence of pixels in the average density mask at an initial stage of processing, thereby preventing a drawback of successive formation of black dots.

Also the addition of dither signals to the sum of the average density and the bias value suppresses the texture formation in a uniform density area.

[Fifth embodiment]

A fifth embodiment of the present invention is featured by a modification of the threshold value setting circuit 2 in FIG. 1.

Figure 18:
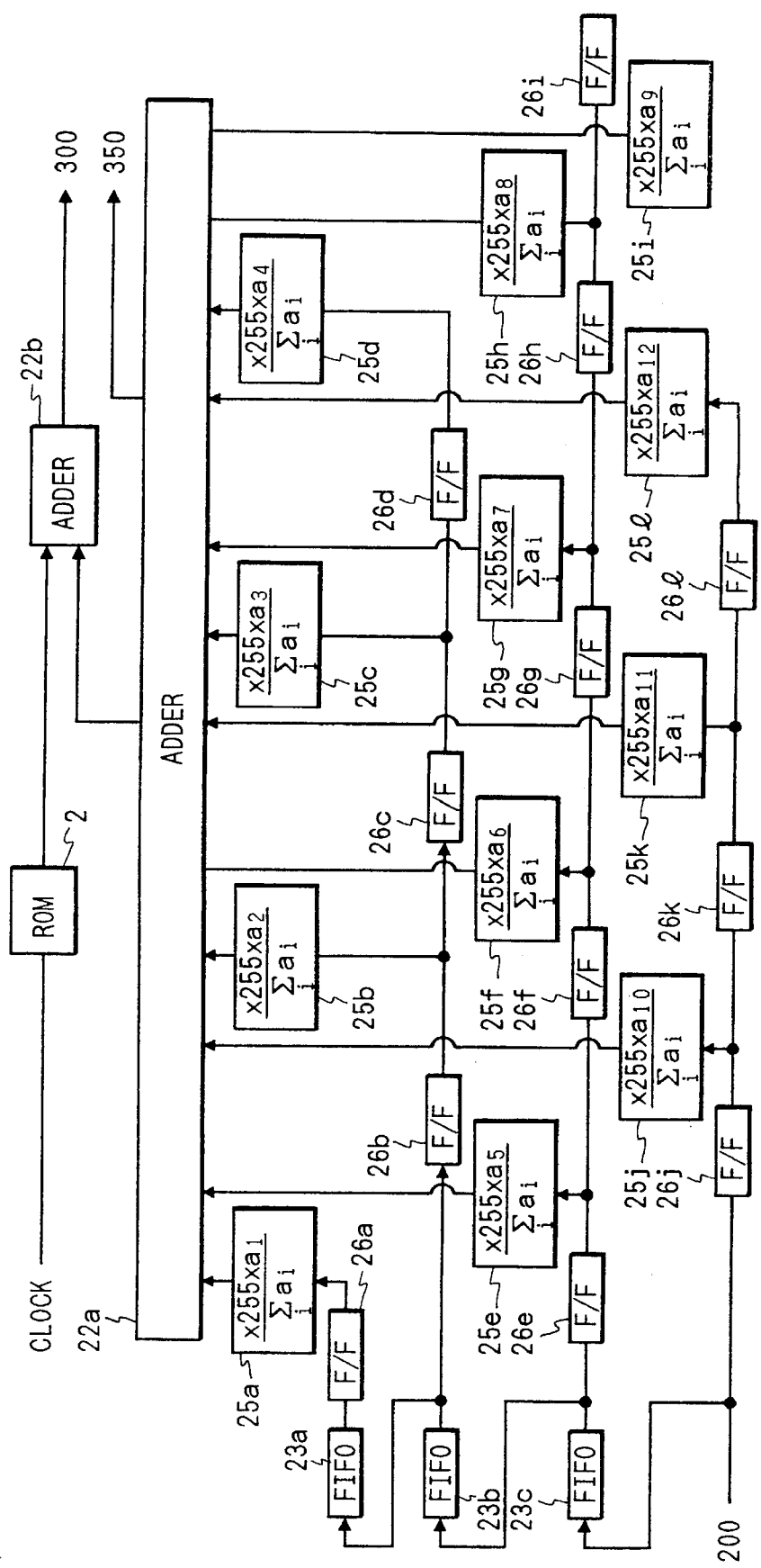
FIG. 18 is a detailed block diagram of a threshold value setting circuit in a fifth embodiment.

FIG. 18 shows the details of the threshold value setting circuit 2 in this fifth embodiment.

In FIG. 18 there are shown a ROM 21 storing dither signals to be added to the threshold value; adders 22a, 22b; FIFO memories 23a–23c for pixel delay; multipliers 25a–25l for multiplying the input data with predetermined constants; and flip-flops 26a–26l for data latching.

In the present circuit 2, binarized data of "1" (black) or "0" (white) are supplied through a data line 200 to the FIFO memory 23c and the latch 26j.

Figure 19:
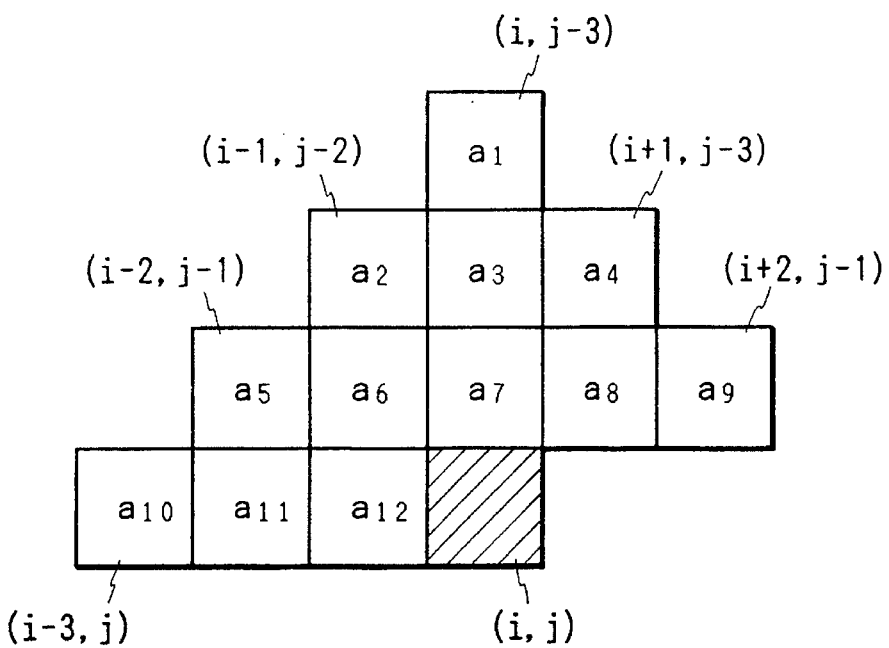
FIGS. 19 and 20 are views showing relationships between the object pixel and pixels used for calculating the average density in the fifth embodiment.

As shown in FIG. 19 with an object pixel at (i, j), the latches 26a–26l store binarized data respectively corresponding to pixels at (i, j–3), (i–1, j–2), (i, j–2), (i+1, j–2), (i–2, j–1), (i–1, j–1), (i, j–1), (i+1, j–1), (i+2, j–1), (i–3, j), (i–2, j) and (i–1, j), which are respectively weighted as follows:

$$255 \times a_1 \times (\text{output from } 26a) / \sum_{i=1}^{12} a_i,$$

$$255 \times a_2 \times (\text{output from } 26b) / \sum_{i=1}^{12} a_1,$$

. . .

$$255 \times a_5 \times (\text{output from } 26e) / \sum_{i=1}^{12} a_i,$$

for supply to the adder 22a.

Figure 20:
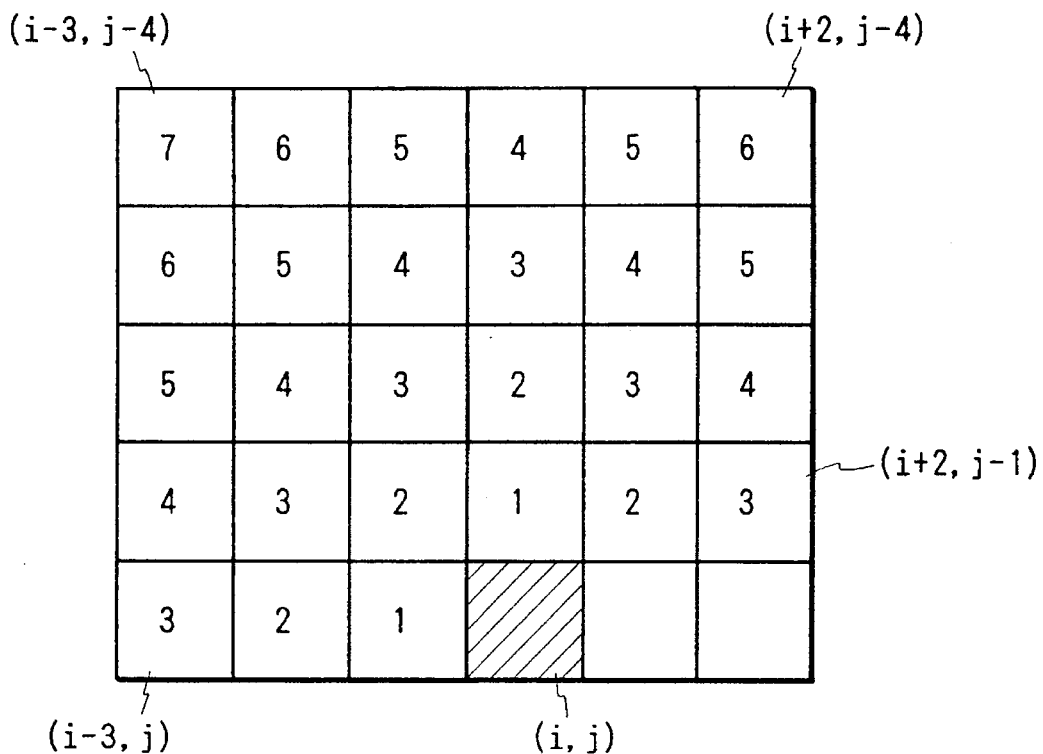

FIG. 20 indicates the city block distance from the object pixel (i, j) to each binary pixel. The city block distance means the number of blocks from the object pixel to each pixel, and is determined by counting the number of blocks neighboring in horizontal or vertical direction. For example the pixel positions (i–1, j) and (i, j–1) are at a city block distance "1", and the pixel positions (i, j–2), (i–1, j–1), (i+1, j–1) and (i–2, j) are at a city block distance "2".

As shown in FIG. 19, the present embodiment calculates the binary average density by referring, among the pixels in the already binarized area, to 12 pixels with a city block distance of "3" or less for the object pixel, but it is also possible to increase or decrease the number of such referred pixels, to for example, 5 pixels with a city block distance of "2" or less or 19 pixels with a city block distance of "4" or less.

The binary average density, obtained by referring to such area, is expected to be more random than that obtained by a simple rectangular reference area, whereby expected is an enhanced effect for preventing texture formation in the uniform density area.

In FIG. 18, the output of the adder 22a (signal line 350) is supplied to the error distribution control circuit 16, and said output is the binary average density around the object pixel and represents the density state in the area around the object pixel.

The ROM 21 storing the dither signals to be added to the threshold value releases values from –8 to +8 one by one in synchronization with clock signals. The output signals are supplied to the adder 22b, added therein with data weighted by the above-mentioned multipliers 25a–25l and released as the threshold value to a data line 300, for use in the binarization circuit. The above-explained control provides the threshold value on the data line 300, by calculating the average density of the already binarized pixels around the object pixel, and adding dither signals for preventing texture formation in the uniform density area. In the foregoing explanation the ROM 21 is assumed to store dither signals from –8 to +8, but the values of these dither signals are not limitative and said dither signals may be replaced by uniform random number.

As explained in the foregoing, the fifth embodiment, determining the average density with binary data within an area of a constant city block distance, allows to provide the threshold values in more random manner, thereby suppressing the texture formation in the uniform density area.

As detailedly explained in the foregoing, the present invention is capable of suppressing formation of a white dot-free area or granular feeling in the low density area, improving the image reproduction at an edge portion, and preventing formation of pseudo contours by textures in the uniform density area, thereby providing a reproduced image of high quality, regardless of the state of the input image.

The foregoing first to fifth embodiments have been explained by monochromatic image data, but these embodiments can be likewise applied, in an image processing system utilizing color image data consisting of yellow, magenta, cyan and black, to each of such color data with similar effects.

We claim:

1. An image processing apparatus that inputs image data representing an image, binarization processes the input image data and visibly outputs a reproduction image based on obtained binary data, said apparatus comprising:

input means for sequentially inputting image data of an object pixel to be binary-digitized;

a calculator for calculating an average density, based on plural binarized data positioned around the object pixel;

a threshold value setter for summing a predetermined correction signal and the average density calculated by said calculator, thereby setting a threshold value, the predetermined correction signal being a signal which varies every time the pixel to be binary-digitized varies;

binarization means for effecting binary digitization according to the threshold value set by said threshold value setter; and output means for visibly outputting the reproduction image by turning on/off dots based on the binary data from said binarization means, wherein said threshold value setter sums a dither signal or a random number and the average density such that any texture pattern is not generated in the reproduction image output by said output means.

2. An apparatus according to claim 1, further comprising:

error distribution means for distributing an error generated at the binary digitization by said binarization means.

3. An apparatus according to claim 2, further comprising:

detection means for detecting whether the object pixel is in an edge portion, wherein said error distribution means is adapted to distribute the generated error according to the result of detection by said detection means.

4. An apparatus according to claim 1, wherein said threshold value setter means is adapted to set threshold values by adding periodically varying dither signals to the average density.

5. An apparatus according to claim 1, wherein said binarization means includes judgment means for judging the state of binary data in a predetermined area, and effects binary digitization based on the result of judgment by said judging means and said threshold value.

6. An image processing apparatus that inputs image data representing an image, binarization-processes the input image data and visibly outputs a reproduction image based on obtained binary data, said apparatus comprising:

a calculator for calculating an average density, based on plural binarized data positioned around an object pixel;

a threshold value setter for setting a threshold value according to the average density calculated by said calculator;

binarization means for effecting binary digitization according to the threshold value set by said threshold value setter;

output means for visibly outputting the reproduction image by turning on/off dots based on the binary data from said binarization means;

memory means for storing the binary data of plural pixels, the binary data being supplied from said binarization means; and judgment means for judging a state of the binary data in a predetermined area, the binary data being stored in said memory means, wherein said judgment means judges whether or not the binary data representing that an "on" state of the dot exists within the predetermined area, and wherein said binarization means converts the input image data into the binary data representing an "off" state of the dot if said judgment means judges that the binary data representing that the "on" state of the dot exists within the predetermined area.

7. An apparatus according to claim 6, further comprising error distribution means for distributing an error generated at the binary digitization by said binarization means.

8. An apparatus according to claim 7, further comprising:

detection means for detecting whether the object pixel is in an edge portion, wherein said error distribution means is adapted to distribute the generated error according to the result of detection by said detection means.

9. An apparatus according to claim 6, wherein said threshold value setter sets the threshold value by adding a predetermined correction signal to the average density calculated by said calculation means.

10. An image processing apparatus that inputs multi-value image data representing an image, converts the input image data into binary image data and visibly outputs a reproduction image based on the converted binary image data, said apparatus comprising:

memory means for storing already binarized image density of plural pixels;

a calculator for calculating a binary average density by referring to image densities within a predetermined area around a position of an object pixel among binarized image densities stored in said memory means;

a threshold value setter for setting a threshold value by summing a predetermined bias signal and the binary average density calculated by said calculator;

error distribution means for distributing a binarization error in the object pixel to pixels positioned behind the object pixel;

binarization means for obtaining a corrected density by summing the density of the object pixel, the error distributed by said error distribution means, effecting binary digitization by comparing the corrected density with the threshold value set by said threshold value setter, and supplying the difference of the corrected density and the binary average density as a new error to said error distribution means; and output means for visibly outputting the reproduction image by turning on/off dots based on the binary data from said binarization means, wherein said threshold value setter sets the threshold value by adding, to the binary average density calculated by said calculator, a constant bias signal regardless of the pixel position and a dither signal or a random number to be used so as not to generate any texture pattern within the reproduction image output by said output means.

11. An image processing apparatus that inputs multi-value image data representing an image, converts the input image data into binary image data and visibly outputs a reproduction image based on the converted binary image data, said apparatus comprising:

memory means for storing already binarized image density of plural pixels;

a threshold value setter for calculating a binary average density having a random characteristic by referring to image densities of pixels positioned within a region about an object pixel, wherein the region is defined by pixels within a uniform block distance of the object pixel, among the binarized pixel densities stored in said memory means, and setting a threshold value based on the calculated binary average density having the random characteristic;

error distribution means for distributing a binarization error in the object pixel to pixels positioned behind the object pixel;

binarization means for obtaining a corrected density by adding, to the density of the object pixel, the error distributed by said error distribution means, effecting binary digitization by comparing the corrected density with the threshold value set by said threshold value setter, and supplying the difference of the corrected density and the binary average density as a new error to said error distribution means; and output means for visibly outputting the reproduction image based on the binary data from said binarization means.

12. An image processing method in which image data representing an image is input, the input image data is binarization-processed and a reproduction image is visibly output based on obtained binary data, said method comprising:

an image processing apparatus-implemented input step for sequentially inputting image data of an object pixel to be binary-digitized;

an image processing apparatus-implemented calculation step for calculating an average density based on plural binarization data positioned around the object pixel;

an image processing apparatus-implemented threshold value setting step for setting a threshold value by summing a predetermined correction signal and the average density calculated in said calculating step, the predetermined correction signal being a signal which varies every time the pixel to be binary-digitized varies;

an image processing apparatus-implemented binarization step for effecting binarization according to a threshold value set in said threshold value setting step; and an image processing apparatus-implemented output step for visibly outputting the reproduction image by turning on/off dots based on the binary data from said binarization step, wherein said threshold value setting step sums a dither signal or a random number and the average density such that any texture pattern is not generated in the reproduction image output by said output step.

13. A method according to claim 12, further comprising:

an error distributing step for distributing an error generated in the binarization in said binarizing step.

14. A method according to claim 13, further comprising a detection step for detecting whether the object pixel is in an edge portion, wherein said error distributing step is adapted to distribute the generated error according to the result of said detection.

15. A method according to claim 12, wherein said threshold value setting step is adapted to set the threshold value by adding periodically varying dither signals to the average density.

16. A method according to claim 12, wherein said binarizing step includes a judging step for judging the state of binary data in a predetermined area, and is adapted to effect binarization based on the result of said judgment and on said threshold value.

17. An image processing method in which image data representing an image is input, the input image data is binarization-processed and a reproduction image is visibly output based on obtained binary data, said method comprising:

an image processing apparatus-implemented calculation step for calculating an average density based on plural binarized data positioned around an object pixel;

an image processing apparatus-implemented threshold value setting step for setting a threshold value according to the average density calculated in said calculation step;

an image processing apparatus-implemented binarizing step for effecting binarization according to the threshold value set in said threshold value setting step;

an image processing apparatus-implemented output step for visibly outputting the reproduction image by turning on/off dots based on the binary data from said binarization step;

an image processing apparatus-implemented storing step for storing the binary data of plural pixels, the binary data being supplied from said binarizing step; and an image processing apparatus-implemented judgment step for judging a state of the binary data in a predetermined area, the binary data being stored in said storing step, wherein said judgment step judges whether or not the binary data representing that an "on" state of the dot exists within a predetermined area, and wherein said binarization step converts the input image data into the binary data representing and "off" state of the dot if said judgment step judges that the binary data representing that the "on" state of the dot exists within the predetermined area.

18. A method according to claim 17, further comprising an error distributing step for distributing an error generated in the binarization in said binarizing step.

19. A method according to claim 18, further comprising a detection step for detecting whether the object pixel is in an edge portion, wherein said error distributing step is adapted to distribute the generated error according to the result of said detection.

20. A method according to claim 17, wherein said threshold value setting step is adapted to set the threshold value by adding a predetermined correction signal to the average density calculated in said calculating step.

* * * * *

UNITED STATES PATENT AND TRADEMARK OFFICE
CERTIFICATE OF CORRECTION

PATENT NO. : 5,610,999

DATED : March 11, 1997

INVENTOR(S) : YUICHI BANNAI, ET AL.

It is certified that error appears in the above-identified patent and that said Letters Patent is hereby corrected as shown below:

COLUMN 2

Line 45, "binary-digitized" should read --binary-digitized,-- and "calculating," should read --calculating--.

COLUMN 5

Line 43, "flip-flips" should read --flip-flops--.

COLUMN 9

Line 22, "circuit 1003" should read --circuit 1004--; and
Line 61, "circuit. 1002" should read --circuit 1002--.

COLUMN 10

Line 19, "positioned" should read --is positioned--.

COLUMN 11

Line 59, "latch 56k." should read --latch 156k.--.

COLUMN 14

Line 31, "pixels, to" should read --pixels to,--.

UNITED STATES PATENT AND TRADEMARK OFFICE
CERTIFICATE OF CORRECTION

PATENT NO. : 5,610,999

DATED : March 11, 1997

INVENTOR(S) : YUICHI BANNAI, ET AL.

Page 2 of 2

It is certified that error appears in the above-identified patent and that said Letters Patent is hereby corrected as shown below:

COLUMN 15

Line 11, "binarization processes" should read --binarization-processes--; and
Line 44, "means" should be deleted.

COLUMN 18

Line 45, "and" should read --an--.

Signed and Sealed this

Seventh Day of October, 1997

Attest:

BRUCE LEHMAN

Attesting Officer

Commissioner of Patents and Trademarks